(12) United States Patent
Kaneko et al.

(10) Patent No.: US 12,736,975 B2
(45) Date of Patent: Sep. 15, 2026

(54) AUTONOMOUS TRAVEL SUPPORT DEVICE, CONTROL METHOD OF WORKING VEHICLE, PROGRAM, AND WORKING VEHICLE

(71) Applicant: YAMABIKO CORPORATION, Ohme (JP)

(72) Inventors: Kazuhiro Kaneko, Ohme (JP); Kenji Nakano, Ohme (JP); Daisuke Ishihira, Ohme (JP); Takahiro Ueno, Ohme (JP)

(73) Assignee: YAMABIKO CORPORATION (JP)

( * ) Notice: Subject to any disclaimer, the term of this patent is extended or adjusted under 35 U.S.C. 154(b) by 23 days.

(21) Appl. No.: 18/897,122

(22) Filed: Sep. 26, 2024

(65) Prior Publication Data

US 2025/0117015 A1 Apr. 10, 2025

(30) Foreign Application Priority Data

Oct. 10, 2023 (JP) ................................ 2023-174921

(51) Int. Cl.

*G05D 1/227* (2024.01)
*G05D 1/229* (2024.01)
*G05D 1/244* (2024.01)
*G05D 105/15* (2024.01)
*G05D 111/10* (2024.01)
*G05D 111/30* (2024.01)
*G05D 111/67* (2024.01)

(52) U.S. Cl.

CPC ........... *G05D 1/2274* (2024.01); *G05D 1/227* (2024.01); *G05D 1/2297* (2024.01); *G05D 1/244* (2024.01);

(Continued)

(58) Field of Classification Search

CPC .... G05D 1/2274; G05D 1/2297; G05D 1/244; G05D 2105/15; G05D 2111/17;

(Continued)

(56) References Cited

U.S. PATENT DOCUMENTS

2015/0012164 A1* 1/2015 Yu ........................ G05D 1/0274 701/23
2017/0364091 A1 12/2017 Bennett et al.

(Continued)

FOREIGN PATENT DOCUMENTS

DE 102016118967 A1 * 4/2018 ........... G01S 15/931
JP 2022-179577 A 12/2022
KR 20210046501 A * 4/2021 ............. G05D 1/244

OTHER PUBLICATIONS

KR20210046501 english translation (Year: 2021).*

(Continued)

*Primary Examiner* — Anne Marie Antonucci
*Assistant Examiner* — Nicholas Patrick Langhorne
(74) *Attorney, Agent, or Firm* — Harness, Dickey & Pierce, P.L.C.

(57) ABSTRACT

An autonomous travel support device is provided that is structurally and electrically attachable to and detachable from a working vehicle. The working vehicle is configured to travel in response to a first operation input by a user. The autonomous travel support device comprises a processor configured to execute a reception step of receiving a switching input being an input for switching a travel mode of the working vehicle to a first mode or a second mode; and a vehicle control step of causing the working vehicle to travel in response to the first operation input in a case where the travel mode is set to the first mode, and of causing the working vehicle to travel autonomously using a preset autonomous travel model in a case where the travel mode is set to the second mode.

20 Claims, 10 Drawing Sheets

(52) U.S. Cl.
CPC ...... *G05D 2105/15* (2024.01); *G05D 2111/17* (2024.01); *G05D 2111/30* (2024.01); *G05D 2111/67* (2024.01)

(58) Field of Classification Search
CPC ............ G05D 2111/30; G05D 2111/67; G05D 1/242; G05D 1/622; G05D 1/227; G05D 2107/23; G05D 2109/10; G05D 2111/10
See application file for complete search history.

(56) References Cited

U.S. PATENT DOCUMENTS

| | | | | |
|---|---|---|---|---|
| 2019/0155278 | A1* | 5/2019 | Idbrant | G01S 13/765 |
| 2019/0208699 | A1* | 7/2019 | Hasegawa | G01S 7/4802 |
| 2020/0310417 | A1* | 10/2020 | Pedersen | G05D 1/0038 |
| 2022/0142045 | A1* | 5/2022 | Kawai | G05D 1/248 |
| 2022/0163961 | A1* | 5/2022 | Song | G05D 1/0022 |
| 2023/0152817 | A1* | 5/2023 | Huang | G05D 1/0011 701/2 |
| 2023/0263093 | A1* | 8/2023 | Suffolk | A01D 34/008 701/23 |
| 2023/0320263 | A1* | 10/2023 | Chen | G05D 1/0044 700/245 |

OTHER PUBLICATIONS

DE 102016118967 english translation (Year: 2018).*
European Search Report issued in the corresponding European Patent Application No. 24204117.6; dated Feb. 11, 2025 (total 11 pages).

* cited by examiner

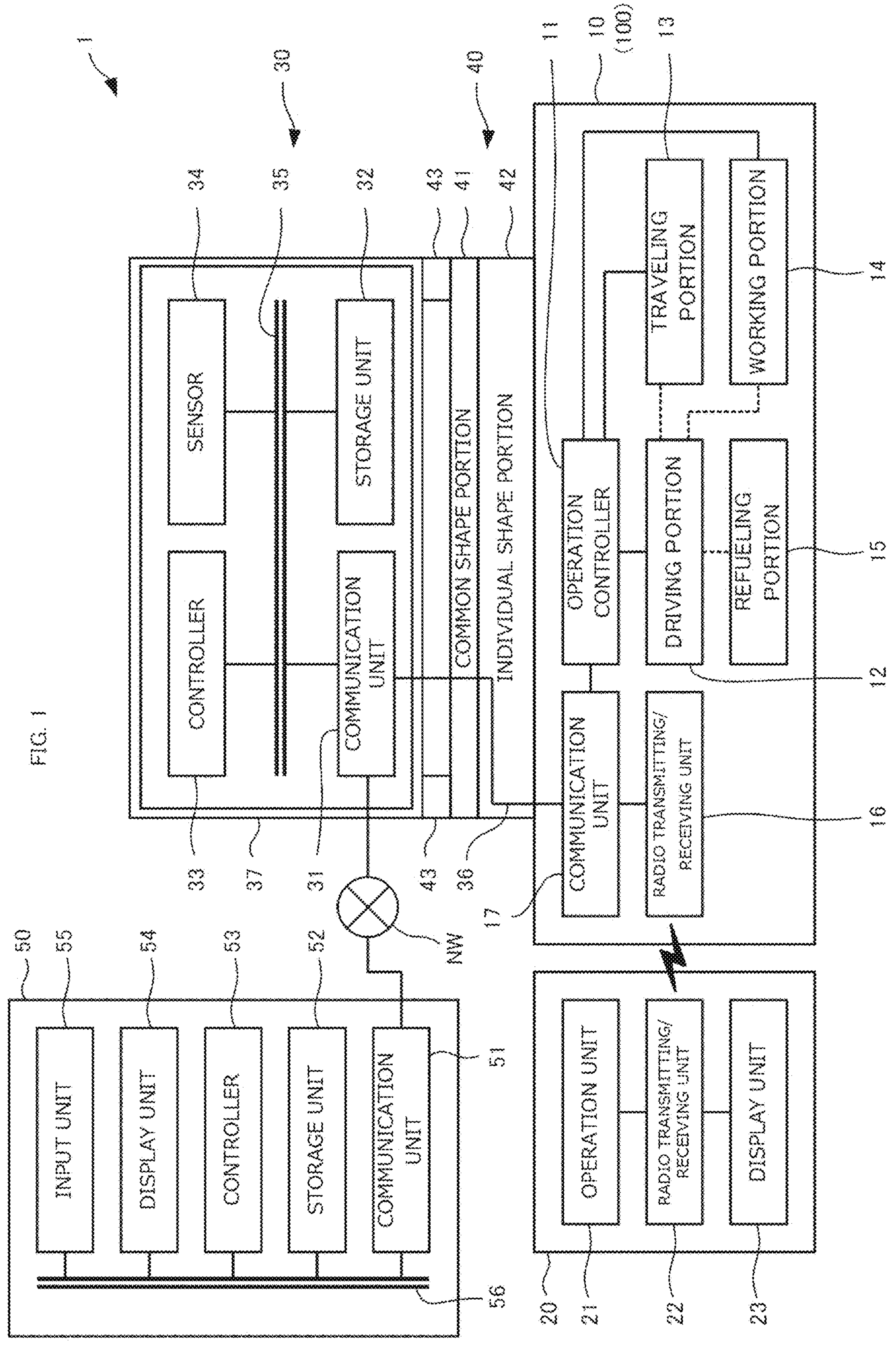
FIG. 1
1
30
40
10
(100)
11
13
34
35
32
43
41
42
SENSOR
STORAGE UNIT
CONTROLLER
COMMUNICATION UNIT
COMMON SHAPE PORTION
INDIVIDUAL SHAPE PORTION
TRAVELING PORTION
WORKING PORTION
OPERATION CONTROLLER
DRIVING PORTION
REFUELING PORTION
COMMUNICATION UNIT
RADIO TRANSMITTING/ RECEIVING UNIT
14
15
12
16
33
37
31
43
36
17
NW
50
55
54
53
52
51
56
INPUT UNIT
DISPLAY UNIT
CONTROLLER
STORAGE UNIT
COMMUNICATION UNIT
OPERATION UNIT
RADIO TRANSMITTING/ RECEIVING UNIT
DISPLAY UNIT
20
21
22
23

1
30
34
37
371
372
43
43
40
41
42
42
151
15
44
12
181
182
13
10
(100)
18
UP
RIGHT
REAR
FRONT
LEFT
DOWN 371
34
372
37
30
40
42
42
1
151
12
10
(100)
181
182
13
13
18
14
UP
RIGHT
LEFT
DOWN 34
30
37
UP
FRONT
REAR
DOWN
42
42
40
1
151
181
10
(100)
12
182
18
13

34
37
30
41
UP
LEFT
RIGHT
DOWN
42
42
40
1
181
10
(100)
12
13
13
14
18

42
34
37
40
30
1
10
(100)
42
18
42
13
181
182
42
41
12
RIGHT
FRONT
REAR
LEFT

33
CONTROLLER
331
VEHICLE CONTROLLER
332
RECEPTION UNIT
333
ACQUISITION UNIT
334
CALCULATION UNIT
GENERATION UNIT
335
SPECIFICATION UNIT
336
SWITCHING UNIT
337
NOTIFICATION UNIT
338

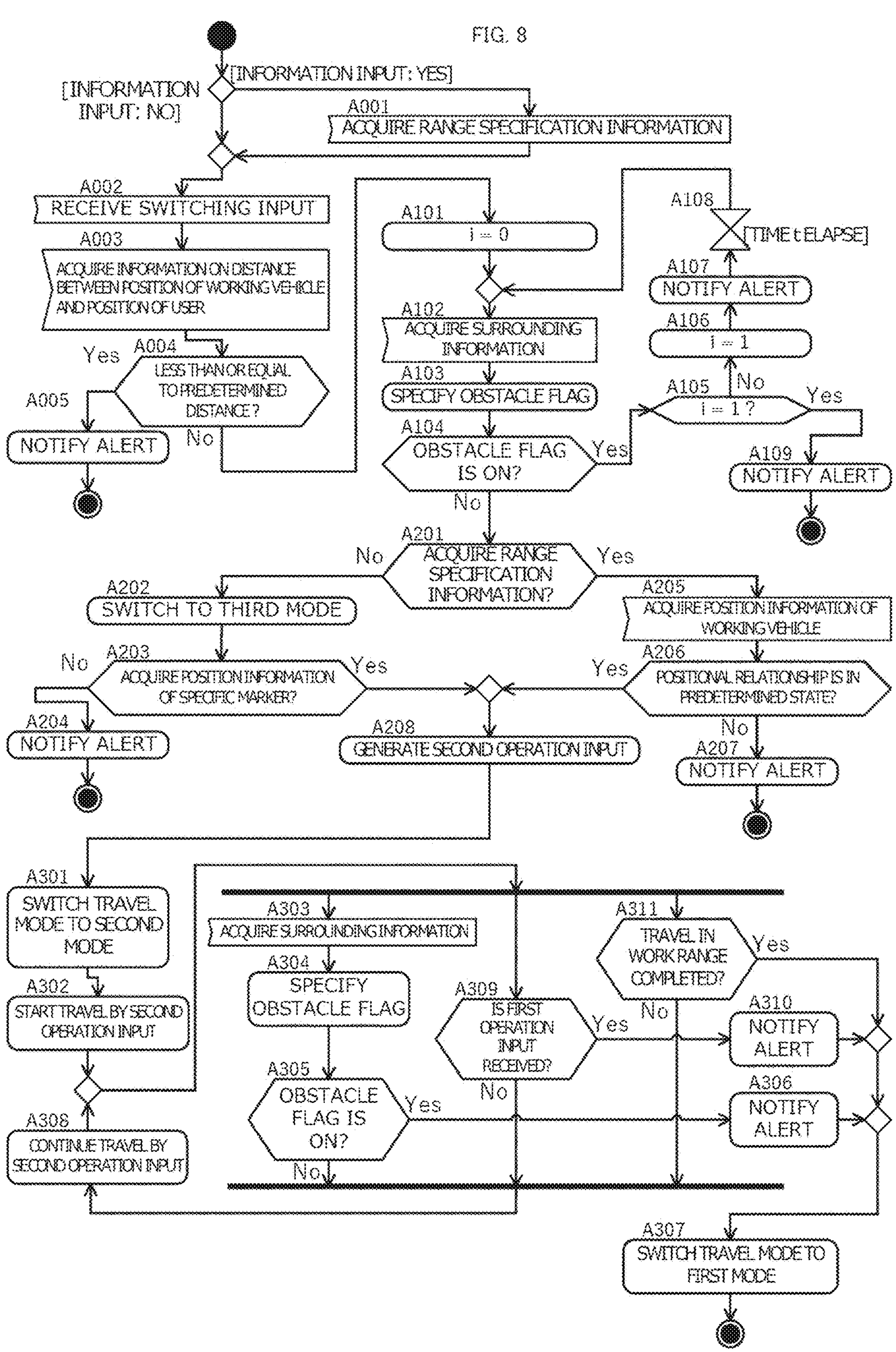
FIG. 8
[INFORMATION INPUT: YES]
[INFORMATION INPUT: NO]
A001
ACQUIRE RANGE SPECIFICATION INFORMATION
A002
RECEIVE SWITCHING INPUT
A003
ACQUIRE INFORMATION ON DISTANCE BETWEEN POSITION OF WORKING VEHICLE AND POSITION OF USER
A004
LESS THAN OR EQUAL TO PREDETERMINED DISTANCE?
Yes
No
A005
NOTIFY ALERT
A101
i = 0
A102
ACQUIRE SURROUNDING INFORMATION
A103
SPECIFY OBSTACLE FLAG
A104
OBSTACLE FLAG IS ON?
Yes
No
A105
i = 1 ?
No
Yes
A106
i = 1
A107
NOTIFY ALERT
A108
[TIME t ELAPSE]
A109
NOTIFY ALERT
A201
ACQUIRE RANGE SPECIFICATION INFORMATION?
No
Yes
A202
SWITCH TO THIRD MODE
A203
ACQUIRE POSITION INFORMATION OF SPECIFIC MARKER?
No
Yes
A204
NOTIFY ALERT
A205
ACQUIRE POSITION INFORMATION OF WORKING VEHICLE
A206
POSITIONAL RELATIONSHIP IS IN PREDETERMINED STATE?
Yes
No
A207
NOTIFY ALERT
A208
GENERATE SECOND OPERATION INPUT
A301
SWITCH TRAVEL MODE TO SECOND MODE
A302
START TRAVEL BY SECOND OPERATION INPUT
A303
ACQUIRE SURROUNDING INFORMATION
A304
SPECIFY OBSTACLE FLAG
A305
OBSTACLE FLAG IS ON?
Yes
No
A306
NOTIFY ALERT
A307
SWITCH TRAVEL MODE TO FIRST MODE
A308
CONTINUE TRAVEL BY SECOND OPERATION INPUT
A309
IS FIRST OPERATION INPUT RECEIVED?
Yes
No
A310
NOTIFY ALERT
A311
TRAVEL IN WORK RANGE COMPLETED?
Yes
No Ar1
1
604
(60)
601
(60)
603
(60)
602
(60)

AUTONOMOUS TRAVEL SUPPORT DEVICE, CONTROL METHOD OF WORKING VEHICLE, PROGRAM, AND WORKING VEHICLE

CROSS REFERENCE TO RELATED APPLICATIONS

The present application claims priority under 35 U.S.C. § 119 to Japanese Patent Application No. 2023-174921, filed Oct. 10, 2023, the contents of which are incorporated herein by reference in their entirety.

BACKGROUND

The present disclosure relates to an autonomous travel support device, a control method of a working vehicle, a program, and a working vehicle.

RELATED ART

JP2022-179577 A discloses the provision of a control device or the like that can realize a situation in which a remote operator can easily concentrate on remotely operating an autonomous vehicle that is the target of remote operation when the remote operator is remotely monitoring a plurality of autonomous vehicles.

This control device or the like is a control device used for remotely monitoring a plurality of autonomous vehicles that is configured to be switchable between an autonomous travel mode and a remote operation mode. This control device comprises: a vehicle specification unit configured to specify non-target vehicles among the plurality of autonomous vehicles other than a target vehicle that is to be remotely operated when a predetermined event occurs; a control command creation unit configured to create a remote operation avoidance control command for causing a non-target vehicle to travel autonomously so as to avoid a situation in which the non-target vehicle requires remote operation when the target vehicle is controlled to travel in a remote operation mode in accordance with the operation of the remote operation device; and a communication unit configured to transmit a remote operation avoidance control command to the non-target vehicle.

However, the conventional technology disclosed in JP2022-179577 A still has something to be improved.

In view of the above circumstances, the present disclosure aims to provide a technique for adding additional functions to an existing working vehicle.

According to an aspect of the present disclosure, an autonomous travel support device is provided that is structurally and electrically attachable to and detachable from a working vehicle. The working vehicle in this autonomous travel support device is configured to travel in response to a first operation input by a user. The autonomous travel support device comprises at least one processor. The processor is configured to execute a program so that each of following steps is executed in a case where the autonomous travel support device is mounted to the working vehicle. In a reception step, a switching input from the user is received. The switching input is an input for switching a travel mode of the working vehicle to a first mode or a second mode. In a vehicle control step, the working vehicle is traveled in response to the first operation input in a case where the travel mode is set to the first mode. In a case where the travel mode is set to the second mode, the working vehicle is traveled autonomously using a preset autonomous travel model.

According to such an aspect, additional functions can be added to an existing working vehicle.

BRIEF DESCRIPTION OF THE DRAWINGS

FIG. 1 shows an example of the overall configuration of a vehicle system 1.

FIG. 8 is an activity diagram showing the flow of a process performed by the vehicle system 1.

DETAILED DESCRIPTION

Figure 2:
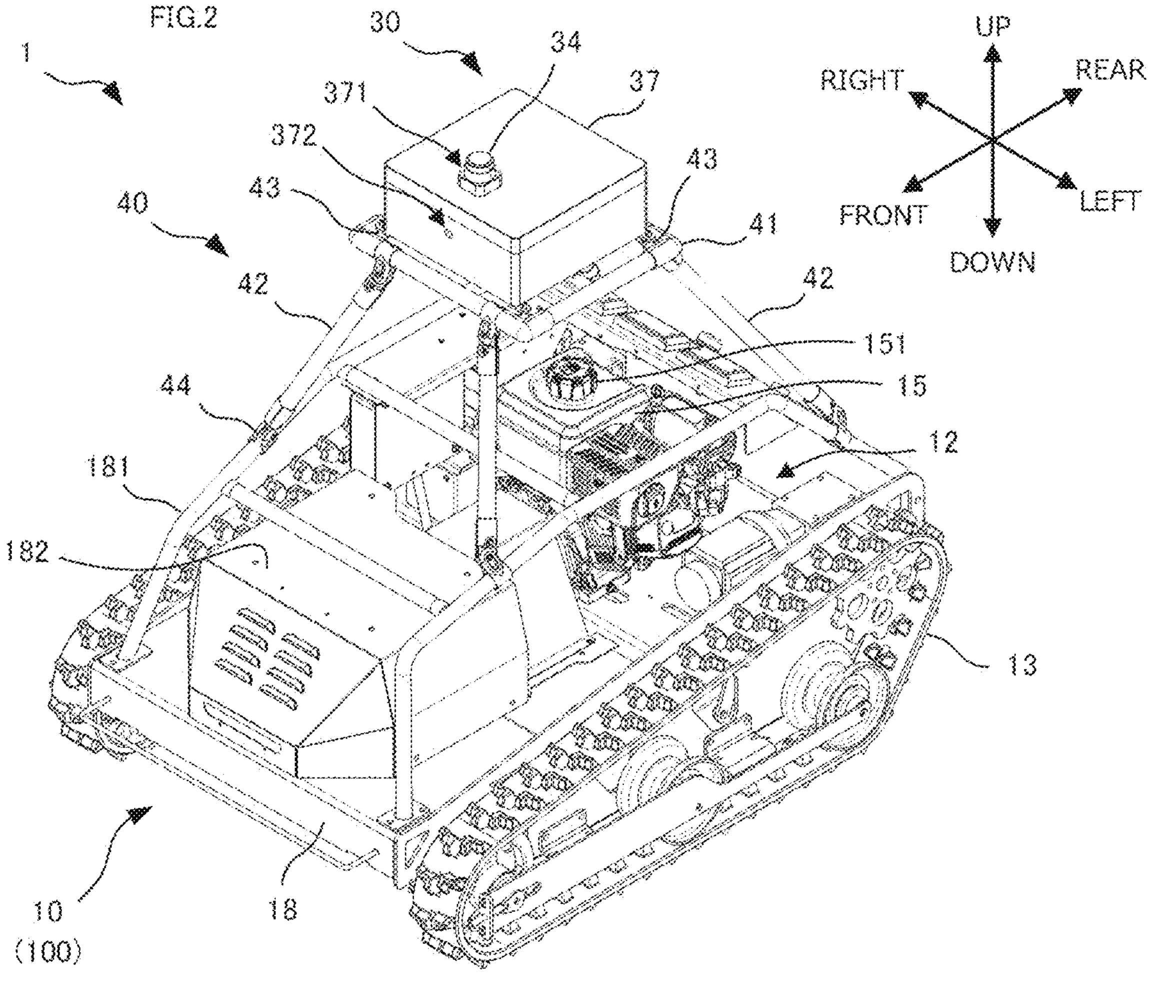
FIG. 2 is a perspective view of the vehicle system 1.

Hereinafter, an embodiment of the present disclosure will be described with reference to the drawings. Various features described in the embodiment below can be combined with each other.

A program for implementing a software described in the present embodiment may be provided as a non-transitory computer-readable medium, may be provided to be downloaded via an external server, or may be provided so that the program is activated on an external computer and the program's function is implemented on a client terminal (that is, the function is provided by so-called cloud computing).

A term "unit" in the present embodiment may include, for example, a combination of a hardware resource implemented as circuits in a broad sense and information processing of software that can be concretely realized by the hardware resource. Furthermore, various kinds of information are described in the present embodiment. Such information may be represented by, for example, physical values of signal values representing voltage and current, high and low signal values as a set of binary bits consisting of 0 or 1, or quantum superposition (so-called qubits), and communication and computation may be executed on a circuit in a broad sense.

Here, the circuit in a broad sense is a circuit realized by properly combining at least a circuit, circuitry, a processor, a memory, and the like. In other words, a circuit includes an application specific integrated circuit (ASIC), a programmable logic device (e.g., simple programmable logic device (SPLD), a complex programmable logic device (CPLD), field programmable gate array (FPGA), and the like.

Hardware Configuration

1. This section describes a hardware configuration of a vehicle system 1 according to one embodiment. FIG. 1 shows an example of the overall configuration of a vehicle system 1. The vehicle system 1 comprises a working vehicle 10, a remote controller 20, an autonomous travel support device 30, a mounting member 40, and an externa terminal 50. The working vehicle 10 is a vehicle for performing a predetermined work; it may be a vehicle that a user can board and manually operate, or a vehicle that can be remotely operated by wireless communication. Preferably, the working vehicle 10 is a grass mower 100 or a chemical sprayer. The predetermined work in this case is, for example, mowing or spraying chemicals in a predetermined area such as a field. The working vehicle 10 and the remote controller 20 are existing products, and the autonomous travel support device 30 is configured to be attachable to and detachable from the working vehicle 10 via the mounting member 40. That is, the autonomous travel support device 30 is an autonomous travel support device that is configured to be structurally and electrically attachable to and detachable from the working vehicle 10. In other words, the working vehicle 10 in the above comprises the autonomous travel support device 30 that is structurally and electrically connected to the working vehicle 10. First, the working vehicle 10 and the remote controller 20, which are existing products, will be described below.

In one embodiment, a "system" comprises one or more devices or components. Thus, it should be noted that, for example, the autonomous travel support device 30 or the external terminal 50 alone may also be an example of a system as a component, the autonomous travel support device 30 and the external terminal 50 may also be examples of a system as components, the working vehicle 10, the autonomous travel support device 30, the mounting member 40 and the external terminal 50 may also be examples of a system as components; and the working vehicle 10, the remote controller 20, the autonomous travel support device 30, the mounting member 40 and the external terminal 50 may also be examples of a system as components.

Working Vehicle 10

As shown in FIG. 1, the working vehicle 10 comprises an operation controller 11, a driving portion 12, a traveling portion 13, a working portion 14, an refueling portion 15, a radio transmitting/receiving unit 16, and a communication unit 17. The working vehicle 10 has a travel function and a work function, and it performs a predetermined work while traveling.

The operation controller 11 is a circuit that controls operations of each portion of the working vehicle 10. The driving portion 12 is a portion that generates driving force. In the working vehicle 10, the driving portion 12 allows an engine that rotates by burning fuel to generate electric power, charges a battery by using the generated electric power, and generates driving force by rotating a motor using the charged electric power. The traveling portion 13 is mechanically connected to the driving portion 12 via gears, etc., and it is a portion that is supplied with driving power from the driving portion 12 to travel the working vehicle 10. The traveling portion 13 is a caterpillar track, such as so-called Caterpillar (registered trademark) in the working vehicle 10.

The working portion 14 is mechanically connected to the driving portion 12 via gears, etc., and it is a portion that performs a predetermined work by being supplied with driving power from the driving portion 12. For example, in the case where the working vehicle 10 is a grass mower 100, the working portion 14 is a cutter that cuts grass by rotating a cutting blade in the working vehicle 10. The refueling portion 15 stores fuel and supplies the stored fuel to the driving portion 12. The radio transmitting/receiving unit 16 has a wireless communication function and performs wireless communication with the remote controller 20. The remote controller 20 will be described later.

The communication unit 17 is a path for transmitting electrical signals and transmits an operation signal received by the radio transmitting/receiving unit 16 to the operation controller 11. The operation controller 11 controls the operation of each portion (the driving portion 12, the traveling portion 13, and the working portion 14) based on the transmitted operation signal. At the same time, the operation controller 11 generates status information indicating an operation status of each portion, converts the generated status information into signals, and transmits the signals to the remote controller 20 via the communication unit 17 and the radio transmitting/receiving unit 16. The status information is information indicating, for example, a traveling speed, a traveling direction, and whether the working portion 14 is in operation or not. The remote controller 20 will be described below.

Remote Controller 20

As shown in FIG. 1, the remote controller 20 comprises an operation unit 21, a radio transmitting/receiving unit 22, and a display unit 23. The remote controller 20 is a controller that has a wireless communication function and remotely controls the working vehicle 10.

The operation unit 21 has an operating lever, receives an operation of the working vehicle 10 by the user, and generates an operation signal indicating the received operation details. The operation of the working vehicle 10 includes traveling forward and backward, turning left and right, turning on/off the working portion 14, traveling speed, and the like. The radio transmitting/receiving unit 22 wirelessly transmits a first operation input, which is an operation signal generated by the operation unit 21, to the working vehicle 10. The radio transmitting/receiving unit 22 receives the status information transmitted from the working vehicle 10. In other words, the working vehicle 10 (excluding the vehicle that the user boards) is configured to travel in response to the first operation input remotely made via the remote controller 20. The display unit 23 displays the received status information (e.g., traveling, cutter in operation, or the like) of the working vehicle 10.

Autonomous Travel Support Device 30

As shown in FIG. 1, the autonomous travel support device 30 includes a communication unit 31, a storage unit 32, a controller 33, and a sensor 34. These components are electrically connected with each other via a communication bus 35 inside a housing 37 of the autonomous travel support device 30. Furthermore, the autonomous travel support device 30 is electrically connected to the working vehicle 10 via the communication unit 31 and a cable 36. The autonomous travel support device 30 is configured to be able to switch a travel mode of the working vehicle 10. Hereinafter, each component will be further described.

Although wired type communication means such as USB, IEEE1394, Thunderbolt (registered trademark), wired LAN network communication, etc. are preferred, the communication unit 31 may include wireless LAN network communication, mobile communication such as LTE/5G, Bluetooth (registered trademark) communication, etc. if necessary. In other words, it is more preferable to implement as a set of these multiple communication means. The autonomous travel support device 30 may communicate various types of information with an external device via the communication unit 31 and a communication network NW. Specifically, the autonomous travel support device 30 is connected to the working vehicle 10 via the communication unit 31 and the cable 36. In addition, the autonomous travel support device 30 is connected to the external terminal 50 via the communication unit 31 and the communication network NW.

The storage unit 32 stores various types of information as defined by the above description. The storage unit 32 may be implemented, for example, as a storage device such as a solid state drive (SSD) storing various programs, etc. related to the autonomous travel support device 30, which is executed by the controller 33; it may also be implemented as a memory such as a random access memory (RAM) storing temporarily necessary information (arguments, sequences, etc.) related to program operations. The storage unit 32 stores various programs, variables, etc. related to the autonomous travel support device 30, which are executed by the controller 33.

The controller 33 (processor) performs processing and controls overall operation related to the autonomous travel support device 30. The controller 33 is, for instance, an unshown CPU (Central Processing Unit). The controller 33 reads a predetermined program stored in the storage unit 32 to implement various functions related to the autonomous travel support device 30. In other words, information processing of software stored in the storage unit 32 is concretely realized by the controller 33 as an example of hardware, and thereby it may be executed as each functional unit included in the controller 33. Further details on these will be described in the next section. It should be noted that the controller 33 is not limited to being singular and may be implemented with two or more controllers 33 for each function. Additionally, a combination thereof may be applied.

The sensor 34 is configured to acquire surrounding information indicating the surroundings of the working vehicle 10. The sensor 34 may be any sensor that is able to acquire information necessary for the working vehicle 10 to travel, such as a LiDAR sensor, a camera, a GNSS receiver, an RTK-GNSS receiver, and the like. The sensor 34 may be a single sensor or a combination of multiple sensors. Specifically, for example, a LiDAR sensor and a camera may be used as the sensor 34. Preferably, the sensor 34 may be configured by a combination of at least one of a camera, a GNSS receiver, or an RTK-GNSS receiver, and a LiDAR sensor. According to such an aspect, it is possible to control autonomous travel more accurately. More preferably, the camera may be a depth camera or a stereo camera. According to such an aspect, it is possible to control autonomous travel further accurately. The surrounding information is information necessary for the working vehicle 10 to travel. For example, information about people, obstacles, feature points, and other objects that are present around the working vehicle 10. Preferably, the sensor 34 may be configured to acquire the positional relationship between the position of the working vehicle 10 and the feature points included in the surrounding information. According to such an aspect, it is possible to accurately control autonomous travel. The mounting position of the sensor 34 is not particularly limited and may be inside or on the exterior of the housing 37. The mounting position of the sensor 34 may be separate from the housing 37 and inside or on the exterior of the working vehicle 10 independent of the autonomous travel support device 30. Preferably, the sensor 34 may be positioned at the top of the working vehicle 10 so as to look down the surroundings of the working vehicle 10. According to such an aspect, the predetermined work can be performed efficiently. In the following, a description will be given of a case where the controller 33 controls the autonomous travel of the working vehicle 10 based on the measurement results by the LiDAR sensor and the images captured by the camera.

Note that the LiDAR (Light Detection And Ranging) sensor is a sensor that emits laser light and measures the distance to an object and its shape, etc. based on information from the reflected light. The LiDAR sensor is a 2D LiDAR (two-dimensional LiDAR) whose optical axis directions are on the same plane and emits laser light in 360-degree directions including front, back, left, and right. The camera is a digital camera that has a lens and an image sensor, etc. and that captures images represented by light reaching the image sensor. In the case where the sensor 34 is a LiDAR sensor, the surrounding information is point cloud data obtained via the LiDAR sensor. According to such an aspect, it is possible to accurately control autonomous travel.

The housing 37 is a rectangular box-shaped member formed of a water-impermeable material such as metal or plastic. The housing 37 has a ceiling portion, four side portions, and a bottom surface portion. The housing 37 stores the communication unit 31, the storage unit 32, the controller 33, and the sensor 34. The housing 37 may be provided with an insertion hole 371 and an imaging hole 372 to acquire information via the sensor 34. Specifically, for example, the insertion hole 371 formed in the ceiling portion of the housing 37 may be used for the LiDAR sensor, and the imaging hole 372 formed in the front side portion of the housing 37 may be used for the camera. The LiDAR sensor is fixed by being inserted into the insertion hole 371 so that a part of the Lidar sensor is exposed to the external space, and the part exposed to the external space emits laser light.

Mounting Member 40

As shown in FIG. 1, the mounting member 40 comprises a common shape portion 41, individual shape portions 42, vibration-proof members 43, and mounting portions 44. The common shape portion 41 is a portion to which the autonomous travel support device 30 is fixed via the vibration-proof members 43. Each of the individual shape portion 42 is a member structurally connecting the common shape portion 41 and bars 181 of the working vehicle 10. The common shape portion 41 is a portion to which the autonomous travel support device 30 is fixed and has a common shape regardless of the working vehicle 10 to which the mounting member 40 is mounted. Each of the individual shape portions 42 is a portion that is fixed to the working vehicle 10 and has a shape adapted to the individual vehicle. Each of the vibration-proof members 43 is a vibration-proof member having the performance of damping vibration, such as a spring or rubber.

External Terminal 50

As shown in FIG. 1, the external terminal 50 has a communication unit 51, a storage unit 52, a controller 53, a display unit 54, and an input unit 55. These components are electrically connected via a communication bus 56 inside the external terminal 50. Descriptions of the communication unit 51, the storage unit 52, and the controller 53 are omitted since they are substantially the same as those of the communication unit 31, the storage unit 32, and the controller 33 in the autonomous travel support device 30.

The display unit 54 may, for example, be included in the housing of the external terminal 50, or the display unit 54 may be externally mounted. The display unit 54 displays a graphical user interface (GUI) screen that can be operated by the user. This should be implemented, for example, by using different display devices such as a CRT display, a liquid crystal display, an organic EL display, and a plasma display.

The input unit 55 may be included in the housing of the external terminal 50 or may be externally mounted. For example, the input unit 55 may be integrated with the display unit 54 and implemented as a touch panel. With a touch panel, the user can input taps, swipes, etc. Of course, a switch button, a mouse, a QWERTY keyboard, etc. may be used instead of a touch panel. In other words, the input unit 55 receives an operation input made by the user. This input, treated as a command signal, is transferred to the controller 53 via the communication bus 56, and the controller 53 may execute predetermined control or calculation as necessary.

Figure 3:
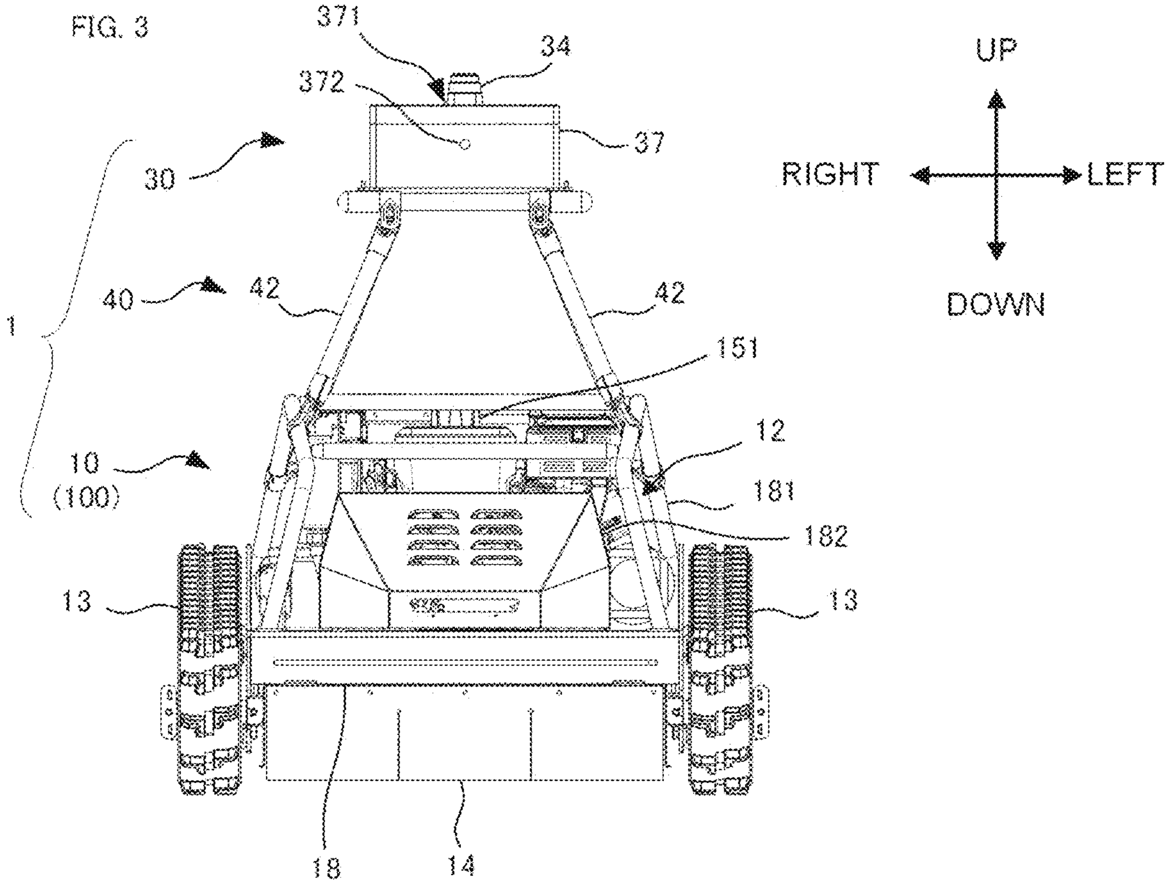
FIG. 3 is a front view of the vehicle system 1.
Figure 4:
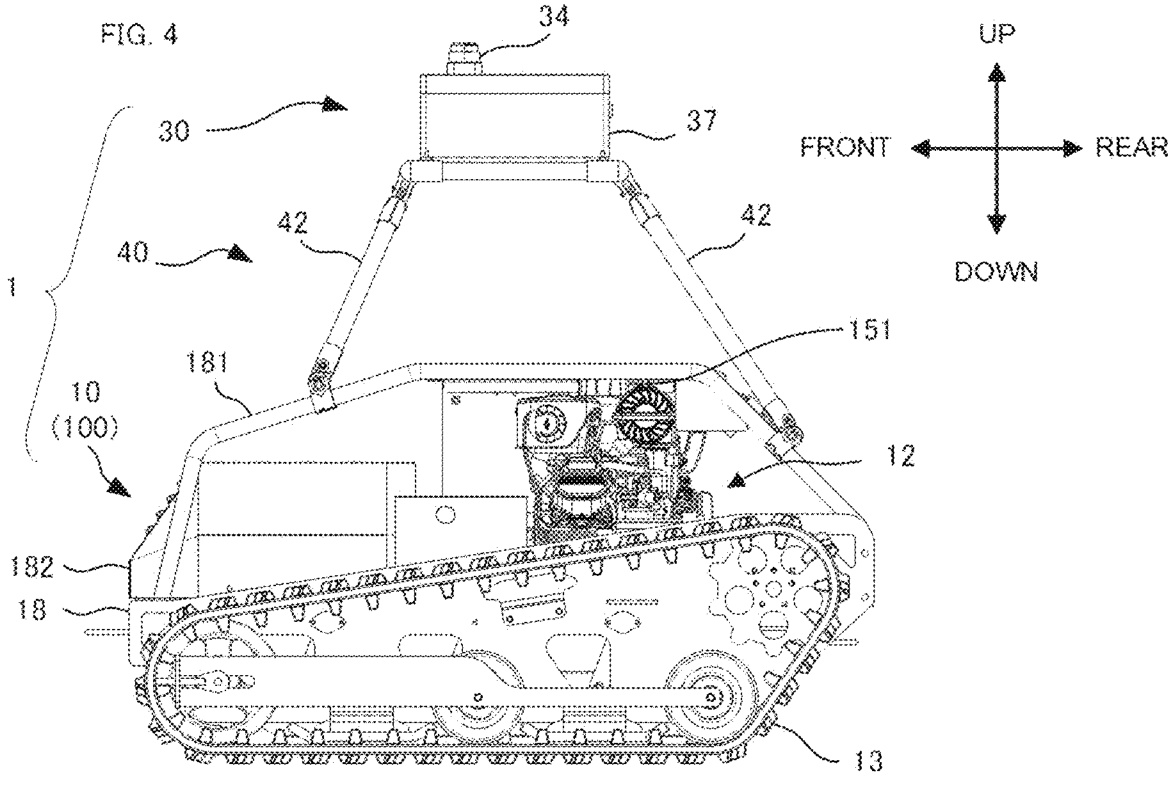
FIG. 4 is a side view of the vehicle system 1.
Figure 5:
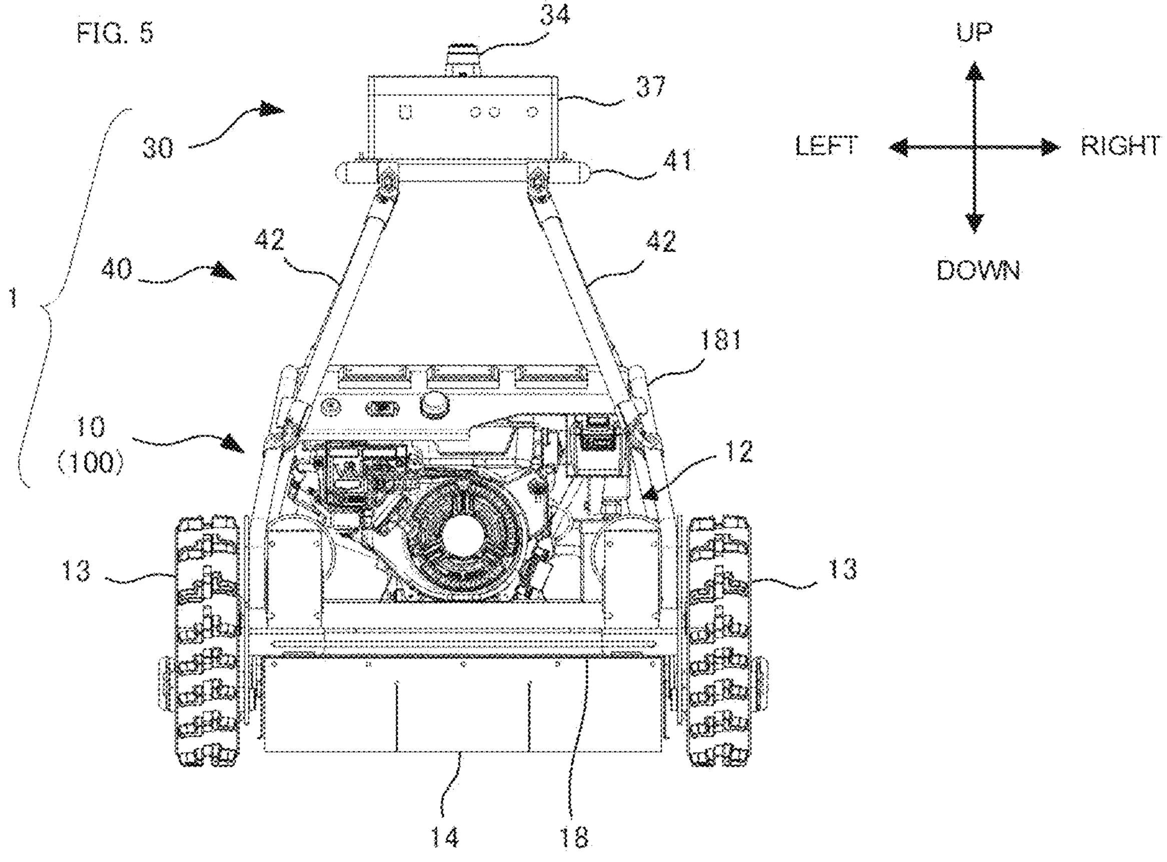
FIG. 5 is a rear view of the vehicle system 1.
Figure 6:
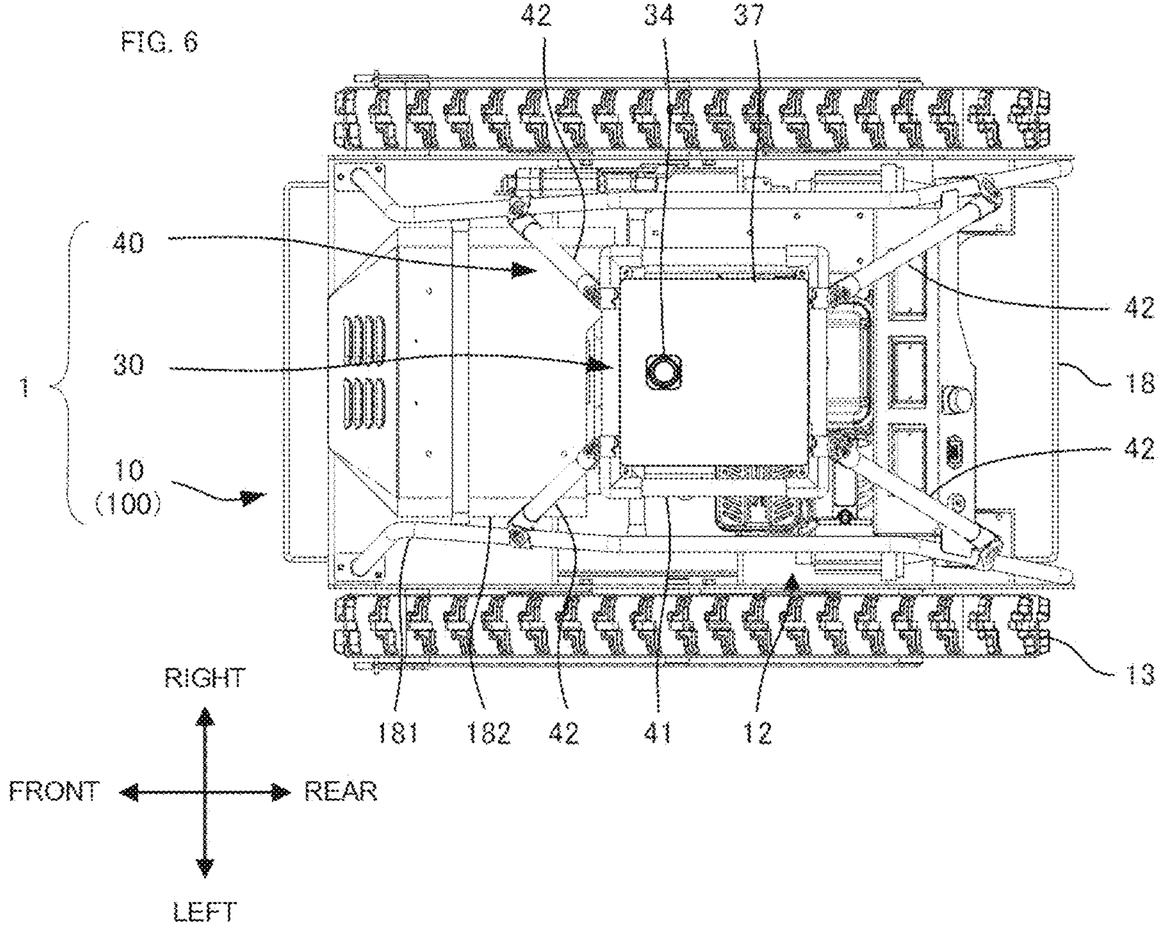
FIG. 6 is a plan view of the vehicle system 1.

Then, the appearance of the vehicle system 1 is described with reference to FIG. 2 through FIG. 6. FIG. 2 is a perspective view of the vehicle system 1. FIG. 3 is a front view of the vehicle system 1. FIG. 4 is a side view of the vehicle system 1. FIG. 5 is a rear view of the vehicle system 1. FIG. 6 is a plan view of the vehicle system 1. Note that directions of each component configuring the vehicle system 1 are defined based on “up and down”, “left and right”, and “front and rear” shown in the drawings. In the grass mower 100 (an example of the working vehicle 10), forward movement is traveling “forward”, and backward movement is traveling “rearward”.

The working vehicle 10 has a frame 18, and bars 181 and a cover 182 are fixed to the frame 18 by screws or the like. In addition, four individual shape portions 42 are fixed to the bars 181 so as to support the common shape portion 41 of the mounting member 40. The autonomous travel support device 30 is fixed to the common shape portion 41 via the vibration-proof members 43.

The space formed by the cover 182 stores the operation controller 11, the radio transmitting/receiving unit 16 and the communication unit 17 shown in FIG. 1. The cable 36 shown in FIG. 1 is routed to one of the four individual shape portions 42. The cable 36 is arranged to the inside of the space formed by the cover 182 and is connected to the communication unit 17 as shown in FIG. 1. In addition, the driving portion 12, the traveling portion 13, the working portion 14, and the refueling portion 15 are mounted to the frame 18. The working portion 14 is mounted below the frame 18 so as to cut the grass that has crept under the working vehicle 10.

The autonomous travel support device 30 is mounted so as to be positioned vertically above a refueling port 51 of the refueling portion 15. As shown in FIG. 5, the autonomous travel support device 30 is provided at a position that is higher than and away from the working vehicle 10 by the individual shape portions 42.

2. Functional Configuration

This section describes a functional configuration of one embodiment. As mentioned above, information processing by software stored in the storage unit 32 is specifically realized by the controller 33, which is an example of hardware, and thus each functional unit included in the controller 33 may be executed. In other words, the vehicle system 1 (e.g., the autonomous travel support device 30) comprises at least one processor (e.g., the controller 33). The processor is configured to execute a program so that each of steps described below is executed in the case where the autonomous travel support device 30 is mounted to the working vehicle 10. According to another aspect, the program allows at least one computer to execute each step by the processor of the autonomous travel support device 30. Each step includes, for example, a vehicle control step, a reception step, an acquisition step, a generation step, a specification step, and a switching step.

Figure 7:
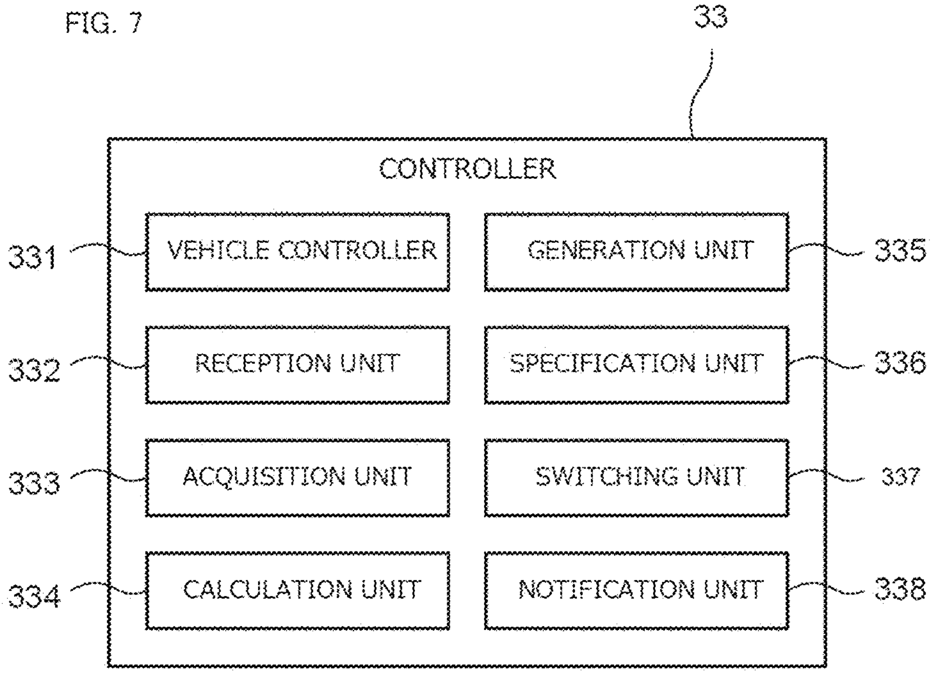
FIG. 7 is a block diagram showing functions realized by a controller 33 or the like in an autonomous travel support device 30.

FIG. 7 is a block diagram showing functions implemented by the controller 33 or the like in the autonomous travel support device 30. Specifically, the controller 33 can function as a vehicle controller 331, a reception unit 332, an acquisition unit 333, a calculation unit 334, a generation unit 335, a specification unit 336, a switching unit 337, and a notification unit 338. Each functional unit will be outlined below.

The vehicle controller 331 is configured to execute various controls related to the working vehicle 10 via the communication unit 31. For example, the vehicle controller 331 is configured to control the travel mode of the vehicle system 1 as the vehicle control step. Details will be described later.

The reception unit 332 is configured to receive various data. For example, as the reception step, the reception unit 332 receives an input or the like from a user either from the storage unit 32 of the autonomous travel support device 30 or from the external terminal 50 via the communication network NW. In one embodiment, various types of information received by the reception unit 332 are described as being stored in the storage unit 32.

The acquisition unit 333 is configured to acquire external information via the communication unit 31. Specifically, as the acquisition step, the acquisition unit 333 acquires the surrounding information indicating the surroundings of the working vehicle 10 via the sensor 34 of the autonomous travel support device 30. In one embodiment, various types of information received by the acquisition unit 333 are described as being stored in the storage unit 32.

The calculation unit 334 is configured to perform various operations in the autonomous travel support device 30.

The generation unit 335 is configured to generate new information from the various types of information. Details will be described later.

As the specification step, the specification unit 336 is configured to specify various types of information. Details will be described later.

As the switching step, the switching unit 337 is configured to switch the travel mode of the vehicle system 1. Details will be described later.

The notification unit 338 is configured to notify various types of information. Details will be described later.

3. Overview of Information Processing

This section describes an overview of the information processing executed by the vehicle system 1.

In one embodiment, it is assumed that the mowing work (an example of the predetermined work) is performed by the grass mower 100 (an example of the working vehicle 10) that travels autonomously within a rectangular field (an example of the work range). The autonomous travel support device 30 is structurally and electrically connected to the grass mower 100 in advance. The grass mower 100 is loaded onto an automobile driven by the user and transported to the vicinity of the field. The user has a remote controller 20 and the external terminal 50 at hand. The process flow in this situation will be described below.

FIG. 8 is an activity diagram showing the flow of the process performed by the vehicle system 1. First, the user prepares the grass mower 100 to perform the mowing work (travelling, cutting the grass, etc.). Specifically, for example, the user starts the engine, which is the driving portion 12, adjusts the position of the cutter which is the working portion 14 and the like by performing predetermined operations in the grass mower 100. The user prepares to remotely control the grass mower 100 through the operation of the remote controller 20 by connecting the grass mower 100 and the remote controller 20 so that they can communicate wirelessly.

In addition, the autonomous travel support device 30 and the external terminal 50 are prepared in response to the preparation of the grass mower 100 and the remote controller 20. First, the calculation unit 334 of the autonomous travel support device 30 executes a process to determine whether the communication with the grass mower 100 via the communication unit 31 and the cable 36 is possible or not. Furthermore, the calculation unit 334 executes a process to determine whether the communication with the external terminal 50 via the communication unit 31 and the communication network NW is possible or not. In the case where the communication with at least one of the grass mower 100 and the external terminal 50 is not possible, the notification unit 338 notifies an alert. The alert is issued by emitting a sound from a speaker (not shown) provided in the autonomous travel support device 30 or displaying information on a display device (not shown). Alternatively, in the case where the communication with the external terminal 50 is possible and the communication with the grass mower 100 is not possible, the alert information may be displayed on the display unit 54 of the external terminal 50 via the communication unit 31 and the communication network NW. The user checks the connection status between the autonomous travel support device 30 and the grass mower 100 and between the autonomous travel support device 30 and the external terminal 50 in response to the alert. In the case where the communication is possible or the connection status has been corrected to allow communication, the process proceeds to the next step.

In the vehicle system 1 at this stage, the travel mode is set to a first mode. The first mode is a mode in which the grass mower 100 is traveled in response to the first operation input. The first operation input is an input from the user via the operation of the remote controller 20. In other words, the working vehicle 10 (as an example, the grass mower 100) is configured to travel in response to the first operation input by the user. That is, as the vehicle control step, the vehicle controller 331 causes the working vehicle 10 (as an example, the grass mower 100) to travel in response to the first operation input in the case where the travel mode is set to the first mode.

Next, in the case where the user has range specification information, the acquisition unit 333 acquires the range specification information via the communication unit 51 and the communication network NW by the operation of the user via the input unit 55 of the external terminal 50 (Activity A001). That is, the acquisition unit 333 is configured to acquire the range specification information as the first acquisition step. The range specification information is information that specifies the work range of the working vehicle 10 (as an example, the grass mower 100) by coordinates. Specifically, for example, the range specification information is information that specifies the range of a field for the mowing work using coordinates. In the case where the user does not have the range specification information or the acquisition unit 333 acquires the range specification information, the process proceeds to Activity A002.

The user operates the input unit 55 to switch the travel mode of the grass mower 100 to autonomous travel (hereinafter also referred to as a "switching input"). Thus, as the reception step, the reception unit 332 receives a switching input from the user via the communication unit 51 and the communication network NW (Activity A002). The switching input is an input for switching the travel mode of the working vehicle 10 (as an example, the grass mower 100) to the first mode or the second mode. The switching input in this case is an input for switching the travel mode from the first mode to the second mode. In addition, the second mode is a mode in which the grass mower 100 is caused to travel autonomously by referring to predetermined reference information without depending on the first operation input. The predetermined reference information is information for autonomously traveling the working vehicle 10. For example, the predetermined reference information is a mathematical model that mathematically relates multiple pieces of information, a learned model in which the correlation of multiple pieces of information has been machine-learned in advance, a rule-based model, or the like. Preferably, the predetermined reference information is an autonomous travel model (an example of a learned model). That is, as the vehicle control step, the vehicle controller 331 causes the working vehicle 10 (as an example, the grass mower 100) to travel autonomously using a preset autonomous travel model in the case where the travel mode is set to the second mode.

Next, the acquisition unit 333 acquires information on the distance between the position of the grass mower 100 and the position of the user (Activity A003). Specifically, for example, the information on the distance between the position of the grass mower 100 and the position of the user may be acquired based on the attenuation of radio waves in wireless communication between the radio transmitting/receiving unit 16 of the grass mower and the radio transmitting/receiving unit 22 of the remote controller 20. In detail, for example, the user operates the remote controller 20, and thus a switching input is transmitted from the radio transmitting/receiving unit 22 of the remote controller 20 to the radio transmitting/receiving unit 16 of the grass mower 100 in Activity A002. The distance between the position of the grass mower 100 and the position of the remote controller 20 corresponding to the position of the user is calculated based on the attenuation of the radio wave in the transmitted switching input. When the distance is calculated, the acquisition unit 333 acquires information on the distance. That is, the acquisition unit 333 acquires information on the distance between the position of the working vehicle 10 and the position where the user has input the switching input via wireless communication.

In addition, the calculation unit 334 executes a process to determine whether the acquired distance is less than or equal to a predetermined distance or not (Activity A004). The predetermined distance in this case is the distance required to safely perform the mowing work and its preparation by the autonomous travel of the grass mower 100. Specifically, for example, the predetermined distance is 2, 3, 4, 5, 6, 7, 8, 9, 10, 11, 12, 13, 14, 15, 16, 17, 18, 19, or 20 meters, or it may be within a range between any two of the values exemplified here. For example, the following description will be given assuming that the predetermined distance is set to 3 meters. In the case where the distance between the position of the grass mower 100 and the position of the remote controller 20 which corresponds to the position of the user is calculated to be 2 meters, the calculation unit 334 determines that the distance is less than or equal to the predetermined distance. In the case where the distance between the position of the grass mower 100 and the position of the remote controller 20 which corresponds to the position of the user is calculated to be 5 meters, the calculation unit 334 determines that the distance is not less than or equal to the predetermined distance.

In the case where it is determined that the distance is less than or equal to the predetermined distance in Activity A004, the notification unit 338 notifies an alert (Activity A005). Specifically, for example, the alert information is displayed on the display unit 54 of the external terminal 50 via the communication unit 31 and the communication network NW. For example, the alert information in this case is to notify the user that he/she should move more than 3 meters (an example of the predetermined distance) away from the grass mower 100, that the grass mower 100 should be traveled by operating the remote controller 20 so as to move more than 3 meters away from the user, that the user should perform the switching input of the travel mode again after dealing with these issues, or the like.

The alert is notified in Activity A005, and then the process ends temporarily. That is, the process has ended without switching the travel mode from the first mode to the second mode even though a switching input, which is an input for switching the travel mode, has been received. In other words, as the first switching step, in the case where the distance between the position of the working vehicle 10 (as an example, the grass mower 100) and the position where the user inputs the switching input via wireless communication is less than or equal to the predetermined distance, the switching unit 337 does not switch the travel mode from the first mode to another travel mode even if a switching input is received. According to such an aspect, the control of switching the travel mode can be performed with greater consideration given to safety.

In order to proceed with the process, the user refers to the alert information and, for example, keeps a distance of more than 3 meters (an example of the predetermined distance) from the grass mower 100. Next, the user inputs a switching input again through the operation via the input unit 55 to switch the travel mode of the grass mower 100 to autonomous travel. This causes the processes in Activities A001 to A004 to be executed again. In the case where Activity A001 has been executed, the process in Activity A001 may be omitted by using the range specification information acquired by the acquisition unit 333 and stored in the storage unit 32. The description of Activity A001 in the case where the process including Activity A001 is executed again is similar to that of the subsequent processes, and thus it will be omitted below.

In the case where it is determined in Activity A004 that the distance is not less than or equal to the predetermined distance, the process proceeds to Activity A101. The calculation unit 334 sets variable i to an initial value (0) (Activity A101).

Next, the acquisition unit 333 acquires the surrounding information, which is information about the surroundings of the grass mower 100 via the sensor 34 (Activity A102). In other words, as the second acquisition step, the acquisition unit 333 acquires the surrounding information indicating the surroundings of the grass mower 100 via the sensor 34 of the autonomous travel support device 30 mounted to the grass mower 100 (an example of the vehicle 10). The surrounding information in this case includes information that can specify whether a person or an obstacle is present or not around the grass mower 100. In the case where it is specified that a person or an obstacle is present around the grass mower 100, the surrounding information further includes information related to the distance from the grass mower 100 to the person or the obstacle. Specifically, for example, in the case where a user as a person and an automobile as an obstacle are located around the grass mower 100, the acquisition unit 333 acquires information that can specify the presence of the user and the automobile as the surrounding information via the LiDAR sensor and the camera (an example of a case where the sensor 34 is configured by combining a plurality of sensors). In addition, the acquisition unit 333 further acquires information via the LiDAR sensor (an example of the sensor 34) that can specify the distance from the grass mower 100 to the user and the distance from the grass mower 100 to the automobile.

The specification unit 336 then specifies an obstacle flag based on the acquired surrounding information. The obstacle flag is a flag that indicates whether a person or an obstacle is present or not within a predetermined distance from the grass mower 100. The predetermined distance in this case is the distance required to safely perform the mowing work and its preparation by autonomous travel of the grass mower 100. Specifically, for example, the predetermined distance is 2, 3, 4, 5, 6, 7, 8, 9, 10, 11, 12, 13, 14, 15, 16, 17, 18, 19, or 20 meters, or it may be within a range between any two of the values exemplified here. In other words, as the specification step, the specification unit 336 specifies an obstacle flag indicating whether a person or an obstacle is present or not within a predetermined distance from the grass mower 100 based on the surrounding information (Activity A103).

Furthermore, the calculation unit 334 executes a process to determine whether the obstacle flag is on or not (Activity A104). Specifically, for example, when the obstacle flag is on, a person or an obstacle is present within a predetermined distance from the grass mower 100. Meanwhile, when the obstacle flag is off, there is no person or obstacle present within a predetermined distance from the grass mower 100. In detail, for example, the following description will be given assuming that the predetermined distance is set to 3 meters. In the case where an automobile as an obstacle and a user as a person are located 2 meters away from the grass mower 100, the calculation unit 334 determines that the obstacle flag is on. Alternatively, in the case where an automobile as an obstacle and a user as a person are located 5 meters away from the grass mower 100, the calculation unit 334 determines that the obstacle flag is off.

In the case where it is determined that the obstacle flag is on in Activity A104, the calculation unit 334 further executes a process to determine whether the value of variable i is (1) or not. (Activity A105). At this stage, since the value of the variable i is (0), it is determined that the value of the variable i is not (1), and the process proceeds to Activity A106. The calculation unit 334 sets the variable i to the value (1) (Activity A106). The notification unit 338 then notifies the user of an alert (Activity A107). Specifically, the alert information is displayed on the display unit 54 of the external terminal 50 via the communication unit 31 and the communication network NW. The alert information in this case is to notify the user that he/she should move away from the grass mower 100 beyond a predetermined distance, that a person or an obstacle other than the user should be moved away from the grass mower 100 beyond a predetermined distance, and the like. Then, subject to elapse of time t, the process returns to Activity A102 (Activity A108). Specifically, for example, the time t may be 0, 5, 10, 15, 20, 25, 30, 35, 40, 45, 50, 55, 60, 90, 120, 150, 180, 210, 240, 270, or 300 seconds, or it may be within a range between any two of the values exemplified here.

After the time t elapses, the processes in Activities A102 to A104 are executed again. That is, during the time t, the user can take actions such that the user himself/herself moves away from the grass mower 100 beyond the predetermined distance, a person or an obstacle other than the user is moved away from the grass mower 100 beyond the predetermined distance, and the like. In other words, after it is determined that the obstacle flag is on in the first process of Activity A104, the user can make the obstacle flag determined to be not on (the obstacle flag is off) in the second process of Activity A104. In the case where it is determined that the obstacle flag is not on, the process proceeds further to switch the travel mode to the second mode. In other words, as the third switching step, the switching unit 337 switches the travel mode to the second mode in the case where the obstacle flag is turned off within a predetermined time (as an example, time t) after the obstacle flag is turned on. According to such an aspect, the control of switching the travel mode can be performed with greater consideration given to safety.

In the case where it is determined that the obstacle flag is on in Activity A104, the calculation unit 334 further executes a process to determine whether the value of the variable i is (1) or not. (Activity A105). At this stage, since the value of the variable i is (1), the calculation unit 334 determines that the value of the variable i is (1) (Activity A105). The notification unit 338 then notifies the user of an alert (Activity A109). Specifically, the alert information is displayed on the display unit 54 of the external terminal 50 via the communication unit 31 and the communication network NW. The alert information in this case is to notify the user that he/she should move away from the grass mower 100 beyond a predetermined distance, that a person or an obstacle other than the user should be moved away from the grass mower 100 beyond a predetermined distance, that the grass mower 100 should be traveled by the operation of the remote controller 20 so that the grass mower 100 is away from a person or an obstacle beyond a predetermined distance, that the user should perform the switching input of the travel mode again after dealing with these issues, or the like.

When the alert is notified in Activity A109, the process ends thereafter. That is, the process has ended without switching the travel mode from the first mode to the second mode even though a switching input, which is an input for switching the travel mode, has been received. In other words, as the third switching step, in the case where the obstacle flag is on, the switching unit 337 does not switch the travel mode from the first mode to another travel mode even if a switching input is received. According to such an aspect, the control of switching the travel mode can be performed with greater consideration given to safety.

In order to proceed with the process, the user refers to the alert information and, for example, keeps a person or an obstacle at a distance of more than 3 meters (an example of the predetermined distance) from the grass mower 100. Next, in order to switch the travel mode of the grass mower 100 to the autonomous travel, the user inputs the switching input again by operating the input unit 55. This causes the processes in Activities A001 through A104 to be executed again.

In the case where it is determined that the obstacle flag is not on (the obstacle flag is off) in Activity A104, the process proceeds to Activity A201.

Next, the calculation unit 334 executes a process to determine whether the range specification information has been acquired or not in Activity A001 (Activity A201). First, a case where it is determined that the range specification information has not been acquired will be described below.

In the case where it is determined that the range specification information has not been acquired, the vehicle controller 331 switches the travel mode to the third mode (Activity A202). That is, as the fourth switching step, the switching unit 337 switches the travel mode to the third mode in the case where a switching input for switching to the second mode is received. The third mode is a mode in which the grass mower 100 performs a predetermined travel that is set in advance. The sensor 34 can acquire the position information of a specific marker 60 by performing the predetermined travel. The specific marker 60 is a marker arranged so as to specify a work range of the working vehicle 10 (as an example, the grass mower 100). In addition, the position information of the specific marker 60 is information that the acquisition unit 333 can acquire as surrounding information. Specifically, the position information of the specific marker 60 includes the distance and height difference from the grass mower 100 to the specific marker 60, information indicating the relative positional relationship of the specific marker 60 from the grass mower 100 such as its direction, or information indicated using coordinates such as latitude and longitude. In other words, as the vehicle control step, the vehicle controller 331 causes the working vehicle 10 to autonomously perform the predetermined travel so that the sensor 34 acquires the position information of the specific marker 60 in the case where the travel mode is set to the third mode. According to such an aspect, the work range desired by the user can be accurately identified. Furthermore, the predetermined travel is autonomous travel that can efficiently acquire information from the surroundings of the grass mower 100 and that is not dependent on a user's operation. The predetermined travel may be, for example, travel such as rotating or turning, or travel in which the grass mower 100 (an example of the working vehicle 10) rotates around an axis perpendicular to the ground with the mounting position of the sensor 34 as an approximate center. According to such an aspect, the work range can be efficiently identified. Specifically, for example, the user may arrange four specific markers 60 in advance at the four corners of a rectangular field. The grass mower 100 performs a turning travel as the predetermined travel. When the camera recognizes one specific marker 60 while the grass mower 100 is performing the predetermined travel, the grass mower 100 further performs the turning travel so that this specific marker 60 is positioned approximately in the center of an imaging range of the camera. Then, the information is acquired via the LiDAR sensor that includes the distance and height difference from the grass mower 100 to the specific marker 60, and information indicating the relative positional relationship of the specific marker 60 from the grass mower 100, such as its direction. Preferably, the switching unit 337 may switch the travel mode from the third travel mode to the first mode even if no switching input is received in the case where the obstacle flag turns from off to on in the predetermined travel in the third mode.

Then, the calculation unit 334 executes a process to determine whether the position information of the specific marker 60 has been acquired or not (Activity A203). Specifically, for example, the calculation unit 334 executes a process to determine whether the position information of the four specific markers 60 arranged at the four corners of the field has been acquired or not. For example, in the case where the position information of only three of the four specific markers 60 has been acquired, the calculation unit 334 executes a process to determine that the position information of the specific markers 60 has not been acquired.

In the case where it is determined that the position information of the specific markers 60 has not been acquired, the notification unit 338 notifies an alert (Activity A204). Specifically, the alert information is displayed on the display unit 54 of the external terminal 50 via the communication unit 31 and the communication network NW. The alert information in this case includes the fact that the position information of the specific markers 60 has not been acquired correctly. For example, the alert information is to notify the user that the position information of the four specific markers 60 has not been acquired, that the user should confirm whether the predetermined travel in the third mode is being performed correctly, or the like. In addition, when an alert is notified in Activity A204, the process ends thereafter.

In order to proceed with the process, the user refers to the alert information, and for example, adjusts the positions of the specific markers 60, prepares the traveling environment of the grass mower 100, or the like so as to acquire the position information of the specific markers 60 correctly. Next, the user inputs the switching input again by operating the input unit 55 to switch the travel mode of the grass mower 100 to the autonomous travel. This causes the processes in Activities A001 to A203 to be executed again.

In the case where it is determined that the position information of the specific markers 60 has been acquired in Activity A203, the process proceeds to Activity A208. As the process proceeds further, a process of switching the travel mode to the second mode is executed. In other words, as the fourth switching step, the switching unit 337 switches the travel mode to the second mode in the case where the position information of the specific markers 60 is acquired as the surrounding information. According to such an aspect, the work can be performed in accordance with the work range desired by the user. A description of the process in Activity A208 will be described later.

Next, a case where it is determined that the range specification information has been acquired in Activity A201 will be described. The acquisition unit 333 acquires the position information of the grass mower 100 (an example of the working vehicle 10) (Activity A205). In other words, the acquisition unit 333 acquires the position information of the working vehicle 10 as the first acquisition step. Specifically, the acquisition unit 333 acquires information specified by coordinates as the position information of the grass mower 100. For example, the position information of the grass mower 100 may be acquired by using a GNSS receiver as the sensor 34 of the autonomous travel support device 30. This allows the positional relationship between the range specification information and the position information of the vehicle to be identified by coordinates.

Then, the calculation unit 334 executes a process to determine whether the positional relationship between the positional information of the grass mower 100 and the range specification information indicating the position of a field (an example of the work range) is in a predetermined state or not (Activity A206). The predetermined state indicates that the working vehicle 10 is in a state where it can start the predetermined work. For example, the predetermined state includes the grass mower 100 being located within a field, the distance traveled by the grass mower 100 to reach the field being less than or equal to the predetermined distance. The predetermined distance in this case is, for example, 0.5, 1, 2, 3, 4, 5, 6, 8, 10, 20, 30, 40, 50, 60, 70, 80, 90, or 100 meters, or it may be within a range between any two of the values exemplified here. For example, the following description will be given assuming that the predetermined distance is set to 10 meters. In the case where the distance traveled by the grass mower 100 to reach the field is 5 meters, the calculation unit 334 determines that the grass mower 100 is in the predetermined state. Alternatively, in the case where the distance traveled by the grass mower 100 to reach the field is 15 meters, the calculation unit 334 determines that the grass mower 100 is not in the predetermined state.

In the case where it is determined that the positional relationship between the position information of the grass mower 100 and the range specification information is not in the predetermined state in Activity A206, the notification unit 338 notifies an alert (Activity A207). Specifically, the alert information is displayed on the display unit 54 of the external terminal 50 via the communication unit 31 and the communication network NW. For example, the alert information in this case is to notify the user that the grass mower 100 should be moved into the field area, that the grass mower 100 should be moved closer to the field, and the like.

In the case where an alert is notified in Activity A207, the process ends thereafter. In order to proceed with the process, the user refers to the alert information and, for example, operates the remote controller 20 to move the grass mower 100 into the field area. Next, the user inputs the switching input again by operating the input unit 55 to switch the travel mode of the grass mower 100 to the autonomous travel. This causes the processes in Activities A001 to A206 to be executed again.

In the case where it is determined that the positional relationship between the position information of the grass mower 100 and the range specification information is in the predetermined state in Activity A206, the process proceeds to Activity A208. As the process proceeds further, a process of switching the travel mode to the second mode is executed. In other words, as the second switching step, the switching unit 337 switches the travel mode to the second mode in accordance with the positional relationship based on the position information of the working vehicle 10 and the range specification information. According to such an aspect, the work can be performed in accordance with the work range desired by the user.

When proceeding to the process in Activity A208, the generation unit 335 generates the second operation input by inputting the surrounding information into the autonomous travel model. In other words, as the generation step, the generation unit 335 generates the second operation input based on the autonomous travel model and the surrounding information. Specifically, for example, the work range is specified by coordinates in the surrounding information. In addition, the position information of the grass mower 100 is associated with the coordinates of the work range. The generation unit 335 generates a travel route and a travel end position on the coordinates by inputting a travel start position and the shape of the work range into the autonomous travel model. Furthermore, the generation unit 335 generates the second operation input for causing the grass mower 100 to travel autonomously so as to correspond to the travel start position, the travel route, and the travel end position.

Next, the switching unit 337 switches the travel mode to the second mode (Activity A301). When the travel mode is switched to the second mode, the grass mower 100 starts autonomous traveling by the second operation input so as to correspond to the generated travel route (Activity A302). In other words, as the vehicle control step, the vehicle controller 331 causes the working vehicle 10 to travel in response to the second operation input in the case where the travel mode is set to the second mode. According to such an aspect, the working vehicle 10 can be traveled autonomously in response to the generated second operation input.

In the process when the grass mower 100 is traveling in the second mode, Activities A303 to A305, A309, and A311 are processed in parallel, and this parallel processing is executed as a loop process.

First, the processes in Activities A303 to A305 will be described. The acquisition unit 333 acquires the surrounding information via the sensor 34 as information about the surroundings of the grass mower 100 while the grass mower 100 is traveling (Activity A303). Specifically, for example, information that can specify whether a person or an obstacle is present or not around the grass mower 100 is acquired. Then, the specification unit 336 specifies the obstacle flag based on the acquired surrounding information (Activity A304). The obstacle flag indicates whether a person or an obstacle is present or not within a predetermined distance from the grass mower 100, as described above. The predetermined distance in this case is the distance required to safely perform the mowing work by autonomous travel of the grass mower 100. Specifically, for example, the predetermined distance is 2, 3, 4, 5, 6, 7, 8, 9, 10, 11, 12, 13, 14, 15, 16, 17, 18, 19, or 20 meters, or it may be within a range between any two of the values exemplified here.

Furthermore, the calculation unit 334 executes a process to determine whether the obstacle flag is on or not (Activity A305). Specifically, for example, when the obstacle flag is on, a person or an obstacle is present within a predetermined distance from the grass mower 100. When the obstacle flag is off, there is no person or obstacle present within a predetermined distance from the grass mower 100. In detail, for example, the following description will be given assuming that the predetermined distance is set to 3 meters and that an obstacle is present in the middle of the travel route of the grass mower 100. As the grass mower 100 travels along the travel route, the grass mower 100 gradually approaches the obstacle. Then, when the obstacle is located within 3 meters from the grass mower 100, the obstacle flag is turned from off to on.

In the case where it is determined that the obstacle flag is on in Activity A305, the notification unit 338 notifies an alert (Activity A306). Specifically, the alert information is displayed on the display unit 54 of the external terminal 50 via the communication unit 31 and the communication network NW. The alert information in this case is to notify the user that the autonomous travel of the grass mower 100 has been interrupted due to the presence of a person or an obstacle, that the user should confirm the presence of the person or the obstacle, that the user should move the person or the obstacle away from the grass mower 100 so as to be beyond a predetermined distance from the grass mower 100, that the user should perform the switching input of the travel mode again after dealing with these issues, or the like.

When the alert is notified in Activity A306, the switching unit 337 switches the travel mode to the first travel mode (Activity A307), and the process ends thereafter. In other words, as the third switching step, the switching unit 337 switches the travel mode from another travel mode to the first mode even if the switching input is not received in the case where the obstacle flag is on. According to such an aspect, the control of switching the travel mode can be performed with greater consideration given to safety.

The user refers to the alert information, and for example, moves the obstacle to another position in order to allow the grass mower 100 to continue traveling autonomously. Next, the user inputs the switching input again by operating the input unit 55 to switch the travel mode of the grass mower 100 to the autonomous travel. This causes the processes in Activities A001 to A305 to be executed again.

In the case where it is determined that the obstacle flag is not on (the obstacle flag is off) in Activity A305, the process proceeds to Activity A308, and the grass mower 100 continues to travel autonomously in response to the second operation input (Activity A308).

Next, the process in Activity A309 will be described. The calculation unit 334 executes a process to determine whether the first operation input is received or not from the user (Activity A309). In the case where it is determined that the first operation input is received from the user in Activity A309, the notification unit 338 notifies an alert (Activity A310). Specifically, the alert information is displayed on the display unit 54 of the external terminal 50 via the communication unit 31 and the communication network NW. The alert information in this case is to notify the user that the autonomous driving has been stopped because of an operation input received from the user via the remote controller 20, that the user needs to input a switching input of the travel mode again in the case where he/she wishes to resume the autonomous travel, or the like.

When the alert is notified in Activity A310, the switching unit 337 switches the travel mode to the first travel mode (Activity A307), and the process ends thereafter. In other words, the switching unit 337 switches the travel mode from the second mode to the first mode as the fifth switching step when the first operation input is made in a case where the travel mode is the second mode. According to such an aspect, the control of switching the travel mode can be performed with greater consideration given to safety.

In the case where the user wants to start the autonomous travel of the grass mower 100 again, the user inputs the switching input again by operating the input unit 55 to switch the travel mode of the grass mower 100 to the autonomous travel. This causes Activities A001 to A309 to be executed again.

In the case where it is determined that the first operation input is not received from the user in Activity A309, the process proceeds to Activity A308; the grass mower 100 continues to travel autonomously in response to the second operation input (Activity A308).

Next, the process in Activity A311 will be described. The calculation unit 334 executes a process to determine whether the travel in the work range has been completed (reached the traveling end position) or not (activity A311). In the case where it is determined that the travel in the work range has been completed (reached the traveling end position) in Activity A311, the switching unit 337 switches the travel mode to the first travel mode (Activity A307), and the process ends thereafter. In this case, the notification unit 338 may notify the user that the mowing work in the desired area has been completed.

In the case where it is determined that the travel in the work range has not been completed (has not reached the traveling end position) in Activity A311, the process proceeds to Activity A308; the grass mower 100 continues to travel autonomously according to the second operation input (Activity A308).

In summary, the autonomous travel support device 30 according to one embodiment is a device that is structurally and electrically attachable to and detachable from the working vehicle 10. The working vehicle 10 is configured to travel in response to the first operation input by the user. The autonomous travel support device 30 comprises at least one processor. The processor comprises a program to cause each of following steps to be executed in the case where the autonomous travel support device 30 is mounted to the working vehicle 10. The reception unit 332 receives a switching input from the user as the reception step. The switching input is an input for switching the travel mode of the working vehicle 10 to the first mode or the second mode. As the vehicle control step, the vehicle controller 331 causes the working vehicle 10 to travel in response to the first operation input in the case where the travel mode is set to the first mode. Meanwhile, the vehicle controller 331 causes the working vehicle 10 to travel autonomously using the preset autonomous travel model in the case where the travel mode is set to the second mode. According to such an aspect, additional functions can be added to the existing working vehicle 10.

According to yet another aspect, a control method of the working vehicle 10 may be provided. This control method comprises a step of mounting the autonomous travel support device 30 to the working vehicle 10 and each step described above executed by the processor of the autonomous travel support device 30. According to such an aspect, additional functions can be added to the existing working vehicle 10.

4. Details

In this section, some of the process flows described in the previous section are further explained with reference to other figures.

4.1 Process to Specify the Work Range by Using Specific Markers 60

Figure 9:
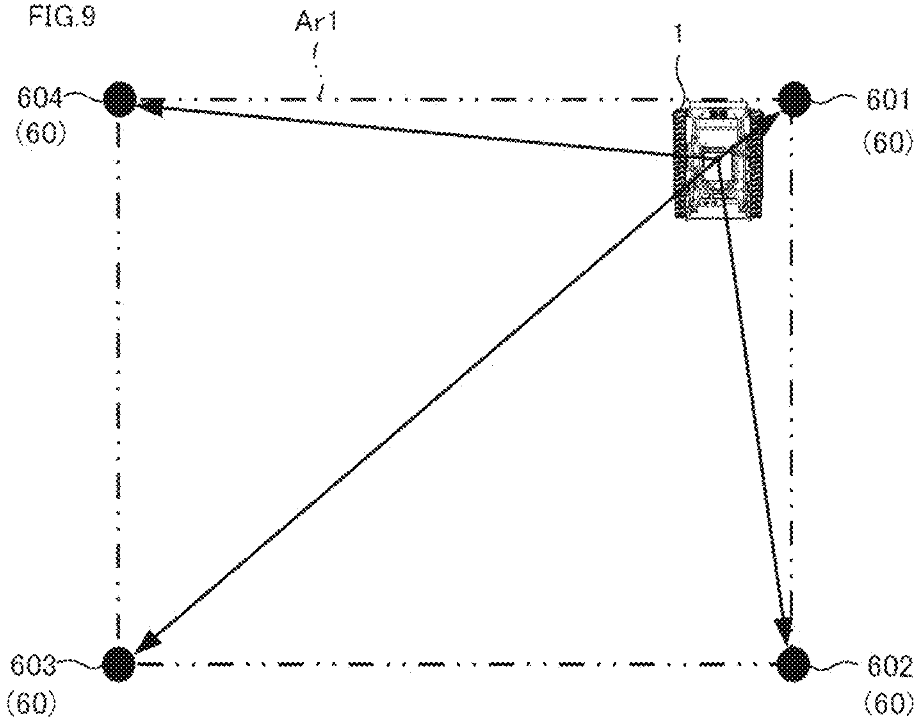
FIG. 9 shows an example of an area where specific markers 60 are arranged.

FIG. 9 shows an example of an area where specific markers 60 are arranged. In the example of FIG. 9, four specific markers 60, i.e., specific markers 601 to 604 (when there is no need to distinguish between them, they will be referred to as "specific markers 60") are arranged at the four corners of a rectangular work area Ar1. In the example of FIG. 9, the specific markers 60 are provided on the boundary of the work area Ar1 to clarify the explanation. The autonomous travel support device 30 will be described below assuming that a LiDAR sensor and a camera, which are examples of the sensor 34, are adopted.

First, the working vehicle 10 performs turning travel (an example of predetermined travel). It is assumed that as the working vehicle 10 makes a right turn, the camera turning together with the working vehicle 10 captures an image of the specific marker 601. The working vehicle 10 then turns and travels further so that the specific marker 601 is positioned approximately in the center of the imaging range of the camera. When the specific marker 601 is positioned approximately in the center of the imaging range of the camera, the information is acquired via the LiDAR sensor that includes the distance and height difference from the grass mower 100 to the specific marker 60 and information indicating the relative positional relationship of the specific marker 60 from the grass mower 100, such as its direction. Next, the working vehicle 10 further makes a right turn, so that the camera turning together with the working vehicle 10 captures an image of the specific marker 602. In the same manner as in the case of the specific marker 601, the information is acquired via the LiDAR sensor that includes the distance and height difference from the grass mower 100 to the specific marker 60 and information indicating the relative positional relationship of the specific marker 60 from the grass mower 100, such as its direction. The same applies to the specific markers 603 and 604.

Figure 10:
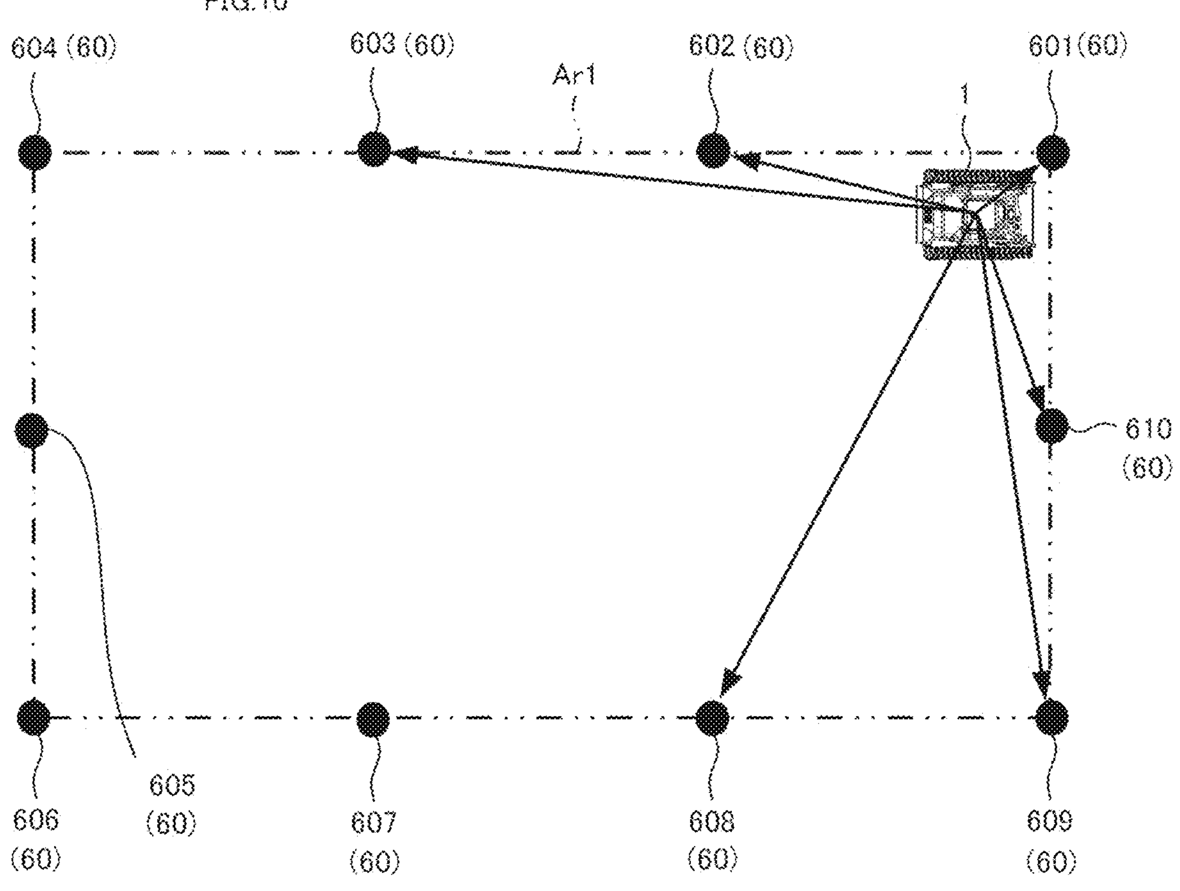
FIG. 10 shows an example of an area where the specific markers 60 are arranged.

FIG. 10 shows an example of an area where the specific markers 60 are arranged. The example of FIG. 10 shows a rectangular work area Ar1 in which ten specific markers 60, i.e., specific markers 601 to 610 (when there is no need to distinguish between them, they will be referred to as "specific markers 60") are arranged. In the example of FIG. 10, it is assumed that the specific markers 60 are provided on the boundary of the work area Ar1 to clarify the explanation. The autonomous travel support device 30 measures the distance and height difference from the grass mower 100 to the specific marker 60, the direction of the specific marker 60 from the grass mower 100, and the like by the LiDAR sensor which is an example of the sensor 34. In the example of FIG. 10, it is assumed that the specific markers 601, 602, 603, 608, 609 and 610 in the detection range of the LiDAR sensor are detected. Meanwhile, the specific markers 604, 605, 606 and 607 outside the detection range are not detected.

The autonomous travel support device 30 controls the working vehicle 10 so that the working vehicle 10 travels within an area whose boundary is in the vicinity of the position of each specific marker 60 detected by the LiDAR sensor. The autonomous travel support device 30 first identifies the area enclosed by the detected specific markers 601, 602, 603, 608, 609, and 610, and then travels within the identified area. When the autonomous travel support device 30 travels close to the specific marker 603, which is an end of the identified area, the autonomous travel support device 30 stops the working vehicle 10 once and detects the specific markers 60 again using the LiDAR sensor.

In this case, the specific markers 604, 605, 606 and 607 also fall within the detection range, and thus the distance, the direction, the height difference, or the like are measured by the LiDAR sensor. In this manner, the autonomous travel support device 30 detects all the specific markers 60 by repeating the process of detecting the specific markers 60 again after traveling to the end of the area whose boundary is in the vicinity of the position of the detected specific marker 60. Then, the autonomous travel support device 30 identifies the work area Ar1 with all the detected specific markers 60 as boundaries.

As explained in FIG. 9 and FIG. 10, the LiDAR sensor (an example of the sensor 34) has a function of detecting positions of the specific markers 60. Each of the specific markers 60 is arranged in the vicinity of the boundary of the area in which the working vehicle 10 travels, as a mark indicating the boundary of the area in which the working vehicle 10 travels. Each of the specific markers 60 is, for example, a plate or a stick having a specific shape, and it is preferably arranged at a position higher than the height of the weeds to be mowed by the working vehicle 10. The LiDAR sensor is preferably provided at a position lower than the upper end of each of the specific markers 60. The LiDAR sensor is provided in this way, thus making it possible to detect the specific markers 60 more accurately compared with the case where the LiDAR 42 is provided at a position higher than the upper end of each of the specific markers 60.

Furthermore, the vicinity of the boundary means a location within a predetermined distance from the boundary. The predetermined distance is a distance for preventing the working vehicle 10 from coming into contact with the specific marker 60 when the working vehicle 10 travels around the edge or corner of the work area Ar1, and it is set to, for example, about several tens of centimeters to several meters. Thus, each of the specific markers 60 is arranged as a guide for the boundary of the work area Ar1.

Others

The vehicle system 1 according to one embodiment can also be implemented in the following aspect.

In one embodiment described above, a process of determining whether the distance between the position of the working vehicle 10 and the position where the user has input the switching input via wireless communication is less than or equal to a predetermined distance or not has been described when the travel mode is set to the first mode. However, the present disclosure is not limited thereto. For example, the process may be performed when the travel mode is set to the second mode and while the travel continues with the second operation input. In other words, as the first switching step, the switching unit 337 may switch the travel mode from the second mode that is another travel mode to the first mode even if the switching input is not received in the case where the distance between the position of the working vehicle 10 and the position where the user has input the switching input via wireless communication is less than or equal to a predetermined distance. According to such an aspect, the control of switching the travel mode can be performed with greater consideration given to safety.

In one embodiment described above, the description has been given of the case where the position information of the specific markers 60 is acquired by performing the predetermined travel. However, the present disclosure is not limited to the case. For example, the sensor 34 of the autonomous travel support device 30 may acquire the position information of the specific markers 60 by rotating with respect to the working vehicle 10. According to such an aspect, the work range can be identified more efficiently.

In one embodiment described above, the case has been described in which when the travel mode is the second mode and the first operation input is made, the travel mode is switched from the second mode to the first mode. However, the present disclosure is not limited thereto. For example, as the reception step, the reception unit 332 may receive a first input signal and a second input signal as the first operation input. Furthermore, as the sixth switching step, the switching unit 337 may switch the travel mode from the second mode to the first mode when the first input signal is received in the second mode and may not switch the travel mode with keeping the second mode when the second input signal is received in the second mode. According to such an aspect, the control of switching the travel mode can be performed with greater consideration given to safety.

In one embodiment described above, the case in which when the travel mode is the second mode and the first operation input is made, the travel mode is switched from the second mode to the first mode. However, the present disclosure is not limited thereto. For example, the first operation input from the remote controller 20 may be invalidated, and the second mode may be switched to the first mode by an input from the external terminal 50.

In one embodiment described above, the case in which two terminals, the remote controller 20 and the external terminal 50, are used has been exemplified. However, the present disclosure is not limited thereto. For example, the remote controller 20 may include the function of the external terminal 50. In this case, a single terminal can operate the working vehicle 10 and start autonomous traveling, making the system user-friendly.

In one embodiment described above, the case in which the travel mode of the working vehicle 10 is switched by an operation via the input unit 55 of the external terminal 50 has been exemplified. However, the present disclosure is not limited thereto. For example, the working vehicle 10 or the autonomous travel support device 30 may be provided with an input unit. Specifically, for example, the housing 37 of the autonomous travel support device 30 may be provided with the input unit, or an existing button, switch, etc. included in the working vehicle 10 may be used as the input unit, or the input unit may be provided by being retrofitted to the working vehicle 10. In this case, it is possible to start autonomous travel even without the external terminal 50, making the system user-friendly.

In one embodiment described above, the vehicle controller 331, the reception unit 332, the acquisition unit 333, the calculation unit 334, the generation unit 335, the specification unit 336, the switching unit 337, and the notification unit 338 have been described as functional units realized by the controller 33 of the autonomous travel support device 30. However, at least some of them may be implemented as functional units realized by the controller 53 of the external terminal 50 or a controller of an external information processing device connected to the communication network NW. Furthermore, the various types of information described in the above examples may be stored not only in the storage unit 32 of the autonomous travel support device 30 but also in other external devices in a distributed manner.

Furthermore, the present disclosure may be provided with each of the following aspects.

(1) An autonomous travel support device that is structurally and electrically attachable to and detachable from a working vehicle, the working vehicle being configured to travel in response to a first operation input by a user, the autonomous travel support device comprising at least one processor configured to execute a program so that each of following steps is executed in a case where the autonomous travel support device is mounted to the working vehicle, the following steps including: a reception step of receiving a switching input from the user, the switching input being an input for switching a travel mode of the working vehicle to a first mode or a second mode; and a vehicle control step of causing the working vehicle to travel in response to the first operation input in a case where the travel mode is set to the first mode, and of causing the working vehicle to travel autonomously using a preset autonomous travel model in a case where the travel mode is set to the second mode.

According to such an aspect, additional functions can be added to the existing working vehicle.

(2) The autonomous travel support device according to (1), wherein: the processor is configured to further execute a first switching step of not switching the first mode to another travel mode even if the switching input is received, or of switching the other travel mode to the first mode even if the switching input is not received, in a case where a distance between a position of the working vehicle and a position where the user inputs the switching input via wireless communication is less than or equal to a predetermined distance.

According to such an aspect, the control of switching the travel mode can be performed with greater consideration given to safety.

(3) The autonomous travel support device according to (1) or (2), wherein: the processor is configured to further execute: a first acquisition step of acquiring position information of the working vehicle and range specification information, the range specification information being information that specifies a work range of the working vehicle by coordinates; and a second switching step of switching the travel mode to the second mode in accordance with a positional relationship based on the position information of the working vehicle and the range specification information.

According to such an aspect, the work can be performed in accordance with the work range desired by the user.

(4) The autonomous travel support device according to any one of (1) to (3), wherein: the processor is configured to further execute: a second acquisition step of acquiring surrounding information indicating surroundings of the working vehicle via a sensor mounted to the working vehicle; and a generation step of generating a second operation input based on the autonomous travel model and the surrounding information, and in the vehicle control step, the working vehicle is caused to travel in response to the second operation input in a case where the travel mode is set to the second mode.

According to such an aspect, the working vehicle can be traveled autonomously in response to the generated second operation input.

(5) The autonomous travel support device according to (4), wherein: the processor is configured to further execute: a specification step of specifying an obstacle flag indicating whether a person or an obstacle is present or not within a predetermined distance from the working vehicle based on the surrounding information; and a third switching step of not switching the first mode to another travel mode even if the switching input is received, or of switching the other travel mode to the first mode even if the switching input is not received, in a case where the obstacle flag is on.

According to such an aspect, the control of switching the travel mode can be performed with greater consideration given to safety.

(6) The autonomous travel support device according to (5), wherein: in the third switching step, the travel mode is switched to the second mode in a case where the obstacle flag is turned off within a predetermined time after the obstacle flag is turned on.

According to such an aspect, the control of switching the travel mode can be performed with greater consideration given to safety.

(7) The autonomous travel support device according to any one of (4) to (6), wherein: the processor is configured to further execute a fourth switching step of switching the travel mode to the second mode in a case where position information of a specific marker is acquired as the surrounding information, the specific marker being a marker arranged so as to specify a work range of the working vehicle.

According to such an aspect, the work can be performed in accordance with the work range desired by the user.

(8) The autonomous travel support device according to (7), wherein: in the fourth switching step, the travel mode is switched to a third mode in a case where the switching input for switching to the second mode is received, and in the vehicle control step, the working vehicle is caused to autonomously perform a predetermined travel so that the sensor acquires the position information of the specific marker in a case where the travel mode is set to the third mode.

According to such an aspect, the work range desired by the user can be accurately identified.

(9) The autonomous travel support device according to (8), wherein: the predetermined travel is travel in which the working vehicle rotates around an axis perpendicular to the ground with a mounting position of the sensor as an approximate center.

According to such an aspect, the work range can be efficiently identified.

(10) The autonomous travel support device according to (7), wherein: the sensor acquires the position information of the specific marker by rotating with respect to the working vehicle.

According to such an aspect, the work range can be identified more efficiently.

(11) The autonomous travel support device according to any one of (4) to (10), wherein: the sensor is configured to acquire a positional relationship between a position of the working vehicle and a feature point included in the surrounding information.

According to such an aspect, it is possible to accurately control autonomous travel.

(12) The autonomous travel support device according to any one of (4) to (11), wherein: the sensor is a LiDAR sensor, and the surrounding information is point cloud data obtained via the LiDAR sensor.

According to such an aspect, it is possible to accurately control autonomous travel.

(13) The autonomous travel support device according to (12), wherein: the sensor is configured by a combination of at least one of a camera, a GNSS receiver, or an RTK-GNSS receiver, and the LiDAR sensor.

According to such an aspect, it is possible to control autonomous travel more accurately.

(14) The autonomous travel support device according to (13), wherein: the camera is a depth camera or a stereo camera.

According to such an aspect, it is possible to control autonomous travel more accurately.

(15) The autonomous travel support device according to any one of (4) to (14), wherein: the sensor is positioned at the top of the working vehicle so as to look down the surroundings of the working vehicle.

According to such an aspect, the predetermined work can be performed efficiently.

(16) The autonomous travel support device according to any one of (4) to (15), comprising the sensor.

(17) The autonomous travel support device according to any one of (1) to (16), wherein: the processor is configured to further execute a fifth switching step of switching the second mode to the first mode when the first operation input is made in a case where the travel mode is the second mode.

According to such an aspect, the control of switching the travel mode can be performed with greater consideration given to safety.

(18) The autonomous travel support device according to any one of (1) to (17), wherein: in the reception step, a first input signal and a second input signal are received as the first operation input, the processor is configured to further execute a sixth switching step of switching the second mode to the first mode when the first input signal is received in the second mode; and of not switching the travel mode with keeping the second mode when the second input signal is received in the second mode.

According to such an aspect, the control of switching the travel mode can be performed with greater consideration given to safety.

(19) A control method of a working vehicle, comprising: a step of mounting the autonomous travel support device according to any one of (1) to (18) to the working vehicle, and each step executed by a processor of the autonomous travel support device.

According to such an aspect, additional functions can be added to the existing working vehicle.

(20) A program, the program being configured to allow a computer to execute each step by a processor of the autonomous travel support device according to any one of (1) to (18).

According to such an aspect, additional functions can be added to the existing working vehicle.

(21) A working vehicle, comprising an autonomous travel support device that is structurally and electrically connected to the working vehicle, the autonomous travel support device being the autonomous travel support device according to any one of (1) to (18).

According to such an aspect, a technique for a working vehicle capable of autonomous traveling can be provided.

(22) The working vehicle according to (21), wherein: the working vehicle is a working vehicle (excluding a vehicle that a user boards), and the working vehicle is configured to travel in response to a first operation input remotely made via a remote controller.

According to such an aspect, a technique for a working vehicle capable of autonomous traveling can be provided.

(23) The working vehicle according to (21) or (22), wherein: the working vehicle is a grass mower or a chemical sprayer.

According to such an aspect, the grass mower can be traveled autonomously to cut grass, or the chemical sprayer can be traveled autonomously to spray chemicals.

Of course, the present disclosure is not limited thereto.

Finally, although various embodiments of the present disclosure have been described, these are presented as examples and are not intended to limit the scope of the present disclosure. Other novel embodiments may be implemented in various forms, and various omissions, substitutions, and modification may be made within the scope of invention without departing from the spirit of the present disclosure. The embodiments or modifications thereof are included in the scope and spirit of the present disclosure, as well as within the scope of the invention and equivalents thereof recited in the claims.

What is claimed is:

1. An autonomous travel support device comprising:
- a sensor configured to sense an environmental state around the working vehicle to provide a sensing result;
- a communication interface configured to communicate, via wired or wireless communication, with a working vehicle, a remote controller, and an external device, the autonomous travel support device being detachably attached to the working vehicle;
- a memory configured to store a program; and
- a processor configured to execute the program so as to:
  - receive an operation input from a user via the communication interface to cause the working vehicle to travel;
  - receive a first switching input as the operation input from the user via the communication interface to operate the working vehicle in a first mode, the first mode manually controlling the travel of the working vehicle by the user via the remote controller held by the user;
  - receive a second switching input as the operation input from the user via the communication interface to operate the working vehicle in a second mode, the second mode autonomously controlling the travel of the working vehicle based on an autonomous program and the sensing result;
  - determine attenuation of a radio wave in the wireless communication between the working vehicle and the remote controller;
  - obtain a distance between the working vehicle and the user holding the remote controller based on the attenuation; and
  - compare the distance to a predetermined distance,
- wherein the processor is further configured to not permit operation in the second mode by disabling the second switching input when the distance is equal to or less than the predetermined distance, and
- the processor is further configured to keep operating in the first mode or to switch to the first mode when the distance is equal to or less than the predetermined distance.

2. The autonomous travel support device according to claim 1, wherein
- the processor is further configured to:
  - acquire position information of the working vehicle and range specification information, the range specification information specifying a work range of the working vehicle by coordinates; and
  - operate in the second mode in accordance with a positional relationship based on the position information of the working vehicle and the range specification information.

3. The autonomous travel support device according to claim 1, wherein
- the processor is further configured to:
  - determine whether an obstacle is present within the predetermined distance from the working vehicle based on the sensing result including the environmental state;
  - turn on an obstacle flag indicating that the obstacle is present within the predetermined distance;
  - not permit operation in the second mode by disabling the second switching input when the obstacle flag is turned on; and
  - keep operating in the first mode or switch to the first mode when the obstacle flag is turned on.

4. The autonomous travel support device according to claim 3, wherein
- the processor is further configured to operate the working vehicle in the second mode in a case where the obstacle flag is turned off within a predetermined time after the obstacle flag is turned on.

5. The autonomous travel support device according to claim 1, wherein
- the processor is further configured to operate the working vehicle in the second mode in a case where position information of a specific marker is acquired as the environmental state, and
- the specific marker is arranged so as to specify a work range of the working vehicle.

6. The autonomous travel support device according to claim 5, wherein
- the processor is further configured to operate the working vehicle in a third mode in a case where the second switching input is received, and
- the working vehicle is caused to autonomously perform a predetermined travel so that the sensor acquires the position information of the specific marker in the third mode.

7. The autonomous travel support device according to claim 6, wherein
- the working vehicle rotates around an axis perpendicular to the ground with a mounting position of the sensor as an approximate center as the predetermined travel.

8. The autonomous travel support device according to claim 5, wherein the sensor acquires the position information of the specific marker by rotating with respect to the working vehicle.

9. The autonomous travel support device according to claim 1, wherein the sensor is configured to acquire a positional relationship between a position of the working vehicle and a feature point included in the environmental state.

10. The autonomous travel support device according to claim 1, wherein the sensor is a LIDAR sensor, and the sensing result is point cloud data obtained via the LIDAR sensor.

11. The autonomous travel support device according to claim 10, wherein the sensor is configured by a combination of the LiDAR sensor and at least one of a camera, a GNSS receiver, and an RTK-GNSS receiver.

12. The autonomous travel support device according to claim 11, wherein the camera is a depth camera or a stereo camera.

13. The autonomous travel support device according to claim 1, wherein the sensor is positioned at a top of the working vehicle so as to sense downwardly at surroundings of the working vehicle.

14. The autonomous travel support device according to claim 1, wherein the processor is further configured to switch operating from the second mode to the first mode when the first switching input is received while operating in the second mode.

15. The autonomous travel support device according to claim 1, wherein the processor is further configured to:

switch operation from the second mode to the first mode when the first switching input is received while operating in the second mode, and keep operating in the second mode when the second switching input is received while operating in the second mode.

16. A control method of the working vehicle, comprising:

a step of mounting the autonomous travel support device according to claim 1 to the working vehicle, and performing each of the processes by the processor of the autonomous travel support device.

17. A non-transitory computer-readable medium storing program, the program being configured to cause a computer to execute each of the processes performed by the processor of the autonomous travel support device according to claim 1.

18. A working vehicle, comprising the autonomous travel support device according to claim 1 structurally and electrically connected to the working vehicle.

19. The working vehicle according to claim 18, wherein the working vehicle is a vehicle, excluding a vehicle on which the user boards, and the working vehicle is configured to travel in response to the operation input via the communication interface, and the operation input is remotely made from the remote controller by the user.

20. The working vehicle according to claim 18, wherein the working vehicle is a grass mower or a chemical sprayer.

* * * * *